(12) United States Patent
Widerski et al.

(10) Patent No.: US 8,382,876 B2
(45) Date of Patent: Feb. 26, 2013

(54) AIR CLEANER ARRANGEMENT; SERVICEABLE FILTER CARTRIDGE; AND, METHODS

(75) Inventors: Robert Widerski, St. Paul, MN (US); Randall Engelland, Farmington, MN (US); Thomas Olson, Prior Lake, MN (US); Gary Gillingham, Prior Lake, MN (US); Richard Suydam, River Falls, WI (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 13/285,239

(22) Filed: Oct. 31, 2011

(65) Prior Publication Data

US 2012/0042616 A1    Feb. 23, 2012

Related U.S. Application Data

(63) Continuation of application No. 11/630,063, filed as application No. PCT/US2005/021255 on Jun. 16, 2005, now Pat. No. 8,048,188.

(51) Int. Cl.
*B01D 39/00* (2006.01)
(52) U.S. Cl. ............. 55/521; 55/313; 55/481; 55/385.3; 55/502; 55/506
(58) Field of Classification Search .................. 55/251, 55/309–313, 357, 385.3, 481, 493, 478, 502–506; 123/198 E
See application file for complete search history.

(56) References Cited

U.S. PATENT DOCUMENTS

| 991,572 | A | 5/1911 | Weisenstein |
|---|---|---|---|
| 1,079,042 | A | 11/1913 | Duncan |
| 1,103,717 | A | 7/1914 | Walton et al. |
| 1,942,600 | A | 1/1934 | Hornung |
| 2,599,604 | A | 6/1952 | Bauer et al. |
| 2,887,177 | A | 5/1959 | Mund et al. |
| 2,890,796 | A | 6/1959 | Blood |
| 2,914,785 | A | 12/1959 | Ela |
| 2,942,127 | A | 6/1960 | Harse |
| 3,019,854 | A | 2/1962 | O'Bryant |
| 3,025,963 | A | 3/1962 | Bauer |
| 3,209,917 | A | 10/1965 | Yelinek |
| 3,216,578 | A | 11/1965 | Wright et al. |
| 3,442,067 | A | 5/1969 | Swenson |
| 3,494,113 | A | 2/1970 | Kinney |
| 3,676,242 | A | 7/1972 | Prentice |
| 3,695,012 | A | 10/1972 | Rolland |

(Continued)

FOREIGN PATENT DOCUMENTS

| CA | 997684 | 9/1976 |
|---|---|---|
| DE | 962 066 | 4/1957 |

(Continued)

OTHER PUBLICATIONS

Pending claims in U.S. Appl. No. 13/214,913.

(Continued)

*Primary Examiner* — Jason M Greene
*Assistant Examiner* — Karla Hawkins
(74) *Attorney, Agent, or Firm* — Merchant & Gould P.C.

(57) ABSTRACT

Principles, techniques and configurations applicable in air cleaner arrangements and filter cartridges therefore, are described. In general the filter cartridge includes an axial pivot arrangement, for pivoting the filter cartridge in place, when mounted in an air cleaner for use. The air cleaner may include a base pivot, for engagement with the pivot projection on the filter cartridge. Methods of assembly, installation and use are described.

19 Claims, 28 Drawing Sheets

U.S. PATENT DOCUMENTS

| | | | |
|---|---|---|---|
| 3,695,437 A | 10/1972 | Shaltis | |
| 3,712,033 A | 1/1973 | Gronholz | |
| 3,740,933 A | 6/1973 | Hollowell | |
| 3,807,150 A | 4/1974 | Maracle | |
| 3,841,953 A | 10/1974 | Kohkamp et al. | |
| 3,849,241 A | 11/1974 | Butin et al. | |
| 3,878,041 A | 4/1975 | Melead | |
| 3,912,631 A | 10/1975 | Turman | |
| 4,065,341 A | 12/1977 | Cub | |
| 4,158,449 A | 6/1979 | Sun et al. | |
| 4,159,899 A | 7/1979 | Deschenes | |
| 4,162,906 A | 7/1979 | Sullivan et al. | |
| 4,187,091 A | 2/1980 | Durre et al. | |
| 4,236,902 A | 12/1980 | Fricke | |
| 4,255,175 A | 3/1981 | Wilkins | |
| 4,282,186 A | 8/1981 | Nonnenmann et al. | |
| 4,285,909 A | 8/1981 | Mizusawa et al. | |
| 4,310,419 A | 1/1982 | Nara et al. | |
| 4,322,231 A | 3/1982 | Hilzendeger et al. | |
| 4,359,330 A | 11/1982 | Copley | |
| 4,394,147 A | 7/1983 | Caddy et al. | |
| 4,402,830 A | 9/1983 | Pall | |
| 4,410,427 A | 10/1983 | Wydeven | |
| 4,430,223 A | 2/1984 | Miyakawa et al. | |
| 4,449,993 A | 5/1984 | Bergeron | |
| 4,480,359 A | 11/1984 | Koster | |
| 4,498,989 A | 2/1985 | Miyakawa et al. | |
| 4,537,608 A | 8/1985 | Koslow | |
| 4,578,091 A | 3/1986 | Borja | |
| 4,589,983 A | 5/1986 | Wydevan | |
| RE32,185 E | 6/1986 | Copley | |
| 4,617,122 A | 10/1986 | Kruse et al. | |
| 4,617,176 A | 10/1986 | Merry | |
| 4,673,503 A | 6/1987 | Fujimoto | |
| 4,678,489 A | 7/1987 | Bertelsen | |
| 4,704,143 A | 11/1987 | Percy | |
| 4,720,292 A | 1/1988 | Engel et al. | |
| 4,759,783 A | 7/1988 | Machado | |
| 4,767,531 A | 8/1988 | Holzer | |
| 4,783,029 A | 11/1988 | Geppert et al. | |
| 4,824,564 A | 4/1989 | Edwards et al. | |
| 4,925,469 A | 5/1990 | Clement et al. | |
| 4,925,561 A | 5/1990 | Ishii et al. | |
| 4,963,170 A | 10/1990 | Weber et al. | |
| 4,963,171 A | 10/1990 | Osendorf | |
| 4,999,038 A | 3/1991 | Lundberg | |
| 5,013,182 A | 5/1991 | Coulvonvaux et al. | |
| 5,030,264 A * | 7/1991 | Klotz et al. | 55/481 |
| 5,049,326 A | 9/1991 | Matsumoto et al. | |
| 5,069,790 A | 12/1991 | Mordeki | |
| 5,082,476 A | 1/1992 | Kahlbaugh et al. | |
| 5,125,941 A | 6/1992 | Ernst et al. | |
| 5,174,895 A | 12/1992 | Drori | |
| 5,211,846 A | 5/1993 | Kott et al. | |
| 5,213,596 A | 5/1993 | Kume et al. | |
| 5,238,474 A | 8/1993 | Kahlbaugh et al. | |
| 5,240,479 A | 8/1993 | Bachinski | |
| 5,304,312 A | 4/1994 | Forster et al. | |
| 5,350,515 A | 9/1994 | Stark et al. | |
| 5,415,677 A | 5/1995 | Ager et al. | |
| 5,435,870 A | 7/1995 | Takagaki et al. | |
| 5,472,463 A | 12/1995 | Herman et al. | |
| 5,484,466 A | 1/1996 | Brown et al. | |
| 5,487,767 A | 1/1996 | Brown | |
| 5,494,497 A | 2/1996 | Lee | |
| 5,536,290 A | 7/1996 | Stark et al. | |
| 5,543,007 A | 8/1996 | Takagaki et al. | |
| 5,547,480 A | 8/1996 | Coulonvaux | |
| 5,582,146 A | 12/1996 | Linsbauer et al. | |
| 5,601,717 A | 2/1997 | Villette et al. | |
| 5,611,922 A | 3/1997 | Stene | |
| 5,613,992 A | 3/1997 | Engel | |
| 5,645,718 A | 7/1997 | Hardison et al. | |
| 5,672,399 A | 9/1997 | Kahlbaugh et al. | |
| 5,683,660 A | 11/1997 | Wirth et al. | |
| 5,685,985 A | 11/1997 | Brown et al. | |
| 5,690,712 A | 11/1997 | Engel | |
| 5,714,126 A | 2/1998 | Frund | |
| 5,730,766 A | 3/1998 | Clements | |
| 5,730,768 A | 3/1998 | Kaminaga et al. | |
| 5,740,774 A | 4/1998 | Kennedy | |
| 5,755,843 A | 5/1998 | Sundquist | |
| 5,772,883 A | 6/1998 | Rothman et al. | |
| D396,098 S | 7/1998 | Gillingham et al. | |
| 5,792,247 A | 8/1998 | Gillingham et al. | |
| D398,046 S | 9/1998 | Gillingham et al. | |
| 5,800,587 A | 9/1998 | Kahlbaugh et al. | |
| 5,820,646 A | 10/1998 | Gillingham et al. | |
| 5,863,313 A | 1/1999 | Coulonvaux | |
| 5,871,557 A | 2/1999 | Tokar et al. | |
| 5,895,574 A | 4/1999 | Friedmann et al. | |
| 5,897,676 A | 4/1999 | Engel | |
| 5,902,364 A | 5/1999 | Tokar et al. | |
| 5,908,480 A | 6/1999 | Ban et al. | |
| D416,308 S | 11/1999 | Ward et al. | |
| D417,268 S | 11/1999 | Gillingham | |
| 6,048,386 A | 4/2000 | Gillingham et al. | |
| D425,189 S | 5/2000 | Gillingham et al. | |
| 6,149,700 A | 11/2000 | Morgan et al. | |
| 6,162,271 A | 12/2000 | Bullinger et al. | |
| 6,164,457 A | 12/2000 | Schlör | |
| 6,179,890 B1 | 1/2001 | Ramos et al. | |
| 6,190,432 B1 * | 2/2001 | Gieseke et al. | 55/385.3 |
| D439,963 S | 4/2001 | Gieseke et al. | |
| 6,217,627 B1 | 4/2001 | Vyskocil et al. | |
| 6,231,630 B1 * | 5/2001 | Ernst et al. | 55/385.3 |
| 6,235,195 B1 | 5/2001 | Tokar | |
| 6,264,713 B1 | 7/2001 | Lewis | |
| 6,299,661 B1 | 10/2001 | Bloomer | |
| 6,306,192 B1 | 10/2001 | Greif et al. | |
| 6,322,602 B2 | 11/2001 | Engel et al. | |
| 6,348,084 B1 | 2/2002 | Gieseke et al. | |
| 6,348,085 B1 | 2/2002 | Tokar et al. | |
| 6,350,291 B1 | 2/2002 | Gieseke et al. | |
| 6,375,700 B1 | 4/2002 | Jaroszczyk et al. | |
| 6,391,076 B1 | 5/2002 | Jaroszczyk et al. | |
| D461,003 S | 7/2002 | Gieseke et al. | |
| 6,416,561 B1 | 7/2002 | Kallsen et al. | |
| 6,482,247 B2 | 11/2002 | Jaroszczyk et al. | |
| 6,511,599 B2 | 1/2003 | Jaroszczyk et al. | |
| 6,572,667 B1 | 6/2003 | Greif et al. | |
| 6,585,792 B2 | 7/2003 | Schneider et al. | |
| 6,598,580 B2 | 7/2003 | Baumann et al. | |
| 6,610,117 B2 | 8/2003 | Gieseke et al. | |
| 6,610,126 B2 | 8/2003 | Xu et al. | |
| 6,641,637 B2 | 11/2003 | Kallsen et al. | |
| D483,459 S | 12/2003 | DeWit et al. | |
| 6,743,317 B2 | 6/2004 | Wydeven | |
| 6,780,217 B1 | 8/2004 | Palmer | |
| 6,783,565 B2 | 8/2004 | Gieseke et al. | |
| 6,875,256 B2 | 4/2005 | Gillingham et al. | |
| 6,878,190 B1 | 4/2005 | Xu et al. | |
| 6,908,494 B2 | 6/2005 | Gillingham et al. | |
| 6,916,360 B2 | 7/2005 | Seguin et al. | |
| 6,953,124 B2 | 10/2005 | Winter et al. | |
| 6,966,940 B2 | 11/2005 | Krisko et al. | |
| 7,004,986 B2 | 2/2006 | Kopec et al. | |
| 7,090,711 B2 | 8/2006 | Gillingham et al. | |
| 7,097,694 B1 | 8/2006 | Jaroszczyk et al. | |
| 7,147,685 B2 | 12/2006 | Lee | |
| 7,211,124 B2 | 5/2007 | Gieseke et | |
| 7,323,029 B2 * | 1/2008 | Engelland et al. | 55/502 |
| 7,396,375 B2 | 7/2008 | Nepsund et al. | |
| 7,520,913 B2 | 4/2009 | Mills et al. | |
| 7,635,403 B2 | 12/2009 | Nepsund et al. | |
| 7,655,074 B2 | 2/2010 | Nepsund et al. | |
| 7,674,308 B2 | 3/2010 | Krisko et al. | |
| 7,682,412 B2 * | 3/2010 | Oh | 55/345 |
| 7,682,416 B2 | 3/2010 | Engelland et al. | |
| 7,708,797 B2 | 5/2010 | Kuempel et al. | |
| 7,713,321 B2 | 5/2010 | Kuempel et al. | |
| 7,736,410 B2 | 6/2010 | Kuempel et al. | |
| 7,905,936 B2 | 3/2011 | Coulonvaux et al. | |
| 7,972,404 B2 | 7/2011 | Kuempel et al. | |
| 7,981,183 B2 | 7/2011 | Nepsund et al. | |
| 8,002,869 B2 | 8/2011 | Nepsund et al. | |
| 8,012,233 B2 | 9/2011 | Kuempel et al. | |

| | | | |
|---|---|---|---|
| 8,048,188 B2 | 11/2011 | Widerski et al. | |
| 8,157,880 B2 | 4/2012 | Muenkel et al. | |
| 2001/0003893 A1 | 6/2001 | Ramos et al. | |
| 2001/0037631 A1 | 11/2001 | Morgan et al. | |
| 2002/0116909 A1 | 8/2002 | Onoda | |
| 2002/0185007 A1 | 12/2002 | Xu et al. | |
| 2002/0189457 A1 | 12/2002 | Dallas et al. | |
| 2003/0154863 A1 | 8/2003 | Tokar et al. | |
| 2004/0020177 A1* | 2/2004 | Ota et al. | 55/385.3 |
| 2004/0173097 A1 | 9/2004 | Engelland et al. | |
| 2004/0221555 A1 | 11/2004 | Engelland et al. | |
| 2004/0255781 A1 | 12/2004 | Tokar et al. | |
| 2005/0022669 A1 | 2/2005 | Xu et al. | |
| 2006/0081528 A1 | 4/2006 | Oelpke et al. | |
| 2006/0090431 A1 | 5/2006 | Brown | |
| 2006/0090434 A1 | 5/2006 | Brown et al. | |
| 2006/0091061 A1 | 5/2006 | Brown | |
| 2006/0091064 A1 | 5/2006 | Brown et al. | |
| 2006/0091084 A1 | 5/2006 | Merritt et al. | |
| 2006/0101999 A1 | 5/2006 | Steins | |
| 2006/0121768 A1 | 6/2006 | Dworatzek et al. | |
| 2006/0123754 A1 | 6/2006 | Oelpke et al. | |
| 2006/0123990 A1 | 6/2006 | Tokar et al. | |
| 2006/0151655 A1 | 7/2006 | Johnston | |
| 2007/0006560 A1 | 1/2007 | Ruhland et al. | |
| 2007/0169449 A1 | 7/2007 | Merritt | |
| 2007/0186527 A1 | 8/2007 | Lampert et al. | |
| 2007/0186528 A1 | 8/2007 | Wydeven et al. | |
| 2007/0186774 A1 | 8/2007 | Gillingham et al. | |
| 2007/0193236 A1 | 8/2007 | Merritt | |
| 2007/0209343 A1 | 9/2007 | Cuvelier | |
| 2007/0261662 A1 | 11/2007 | Lampert et al. | |
| 2008/0011672 A1 | 1/2008 | Schwartz et al. | |
| 2009/0199520 A1 | 8/2009 | Mills et al. | |
| 2010/0107577 A1 | 5/2010 | Krisko et al. | |
| 2010/0115897 A1 | 5/2010 | Krisko et al. | |
| 2010/0154368 A1 | 6/2010 | Kopec et al. | |
| 2010/0186353 A1 | 7/2010 | Ackermann et al. | |

FOREIGN PATENT DOCUMENTS

| | | |
|---|---|---|
| DE | 3405719 A1 | 8/1985 |
| DE | 39 36 837 A1 | 4/1991 |
| DE | 40 31 014 C2 | 11/1993 |
| DE | 44 15 890 A1 | 11/1995 |
| EP | 0 376 443 A2 | 7/1990 |
| EP | 0 486 276 A1 | 5/1992 |
| EP | 0 492 250 | 7/1992 |
| EP | 0 529 921 A1 | 3/1993 |
| EP | 0 704 233 A1 | 4/1996 |
| EP | 0 726 389 | 8/1996 |
| EP | 0 738 528 | 10/1996 |
| EP | 1 159 052 B1 | 11/2003 |
| EP | 1 364 695 A1 | 11/2003 |
| EP | 1 169 109 B1 | 4/2004 |
| EP | 1 731 749 A1 | 12/2006 |
| EP | 1 509 311 B1 | 1/2007 |
| FR | 2 034 160 | 12/1970 |
| GB | 703823 | 2/1954 |
| GB | 1275651 | 5/1972 |
| GB | 2 106 634 A | 4/1993 |
| JP | S58-151417 | 3/1982 |
| JP | 59-26113 | 2/1984 |
| JP | S60-155921 | 3/1984 |
| JP | 59-170669 | 11/1984 |
| JP | 60-112320 | 7/1985 |
| JP | H02-48118 | 9/1988 |
| JP | 1-11971 | 1/1989 |
| JP | 1-171615 | 7/1989 |
| JP | 9-234321 | 9/1997 |
| JP | 63-122617 | 6/1998 |
| JP | H02-48117 | 9/1998 |
| WO | 88/03431 | 5/1988 |
| WO | 88/03432 | 5/1988 |
| WO | 97/40908 | 11/1997 |
| WO | 97/40910 | 11/1997 |
| WO | 97/40917 | 11/1997 |
| WO | 97/41939 | 11/1997 |
| WO | 97/45200 | 12/1997 |
| WO | 98/35144 | 8/1998 |
| WO | 99/37381 | 7/1999 |
| WO | 99/47237 | 9/1999 |
| WO | 00/50149 | 8/2000 |
| WO | 00/74818 | 12/2000 |
| WO | 02/49741 | 6/2002 |
| WO | 03/084641 | 10/2003 |
| WO | 03/095068 | 11/2003 |
| WO | 2004/020075 | 3/2004 |

OTHER PUBLICATIONS

Pending claims in U.S. Appl. No. 13/022,188.
PCT search report and written opinion for corresponding PCT.

* cited by examiner

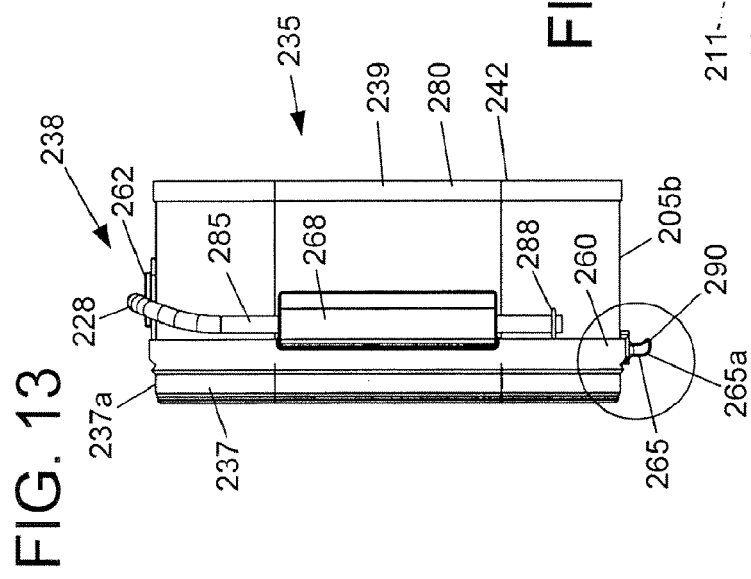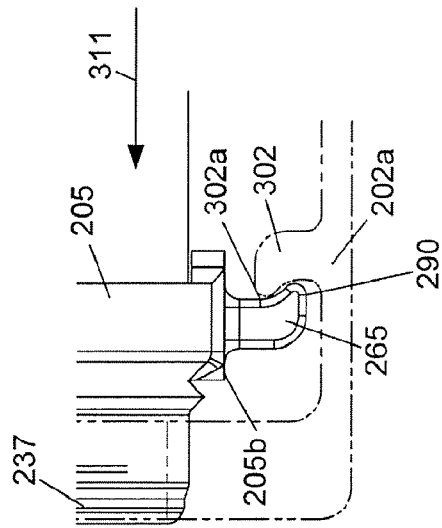
FIG. 13
FIG. 14
FIG. 15

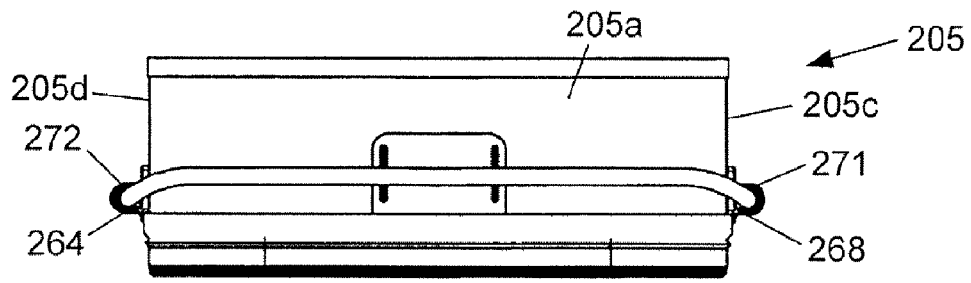
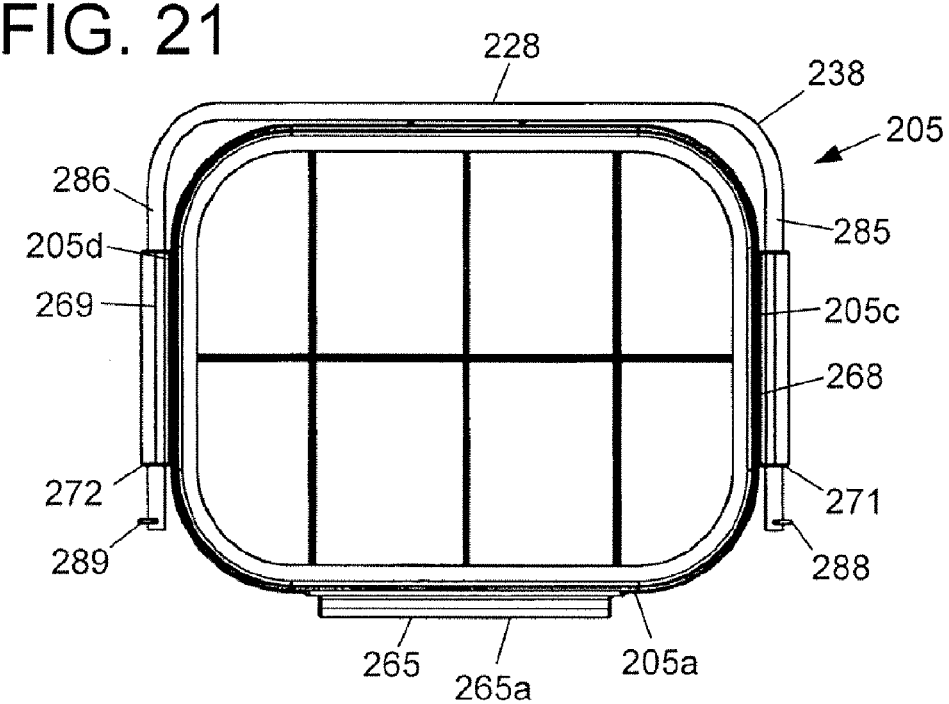
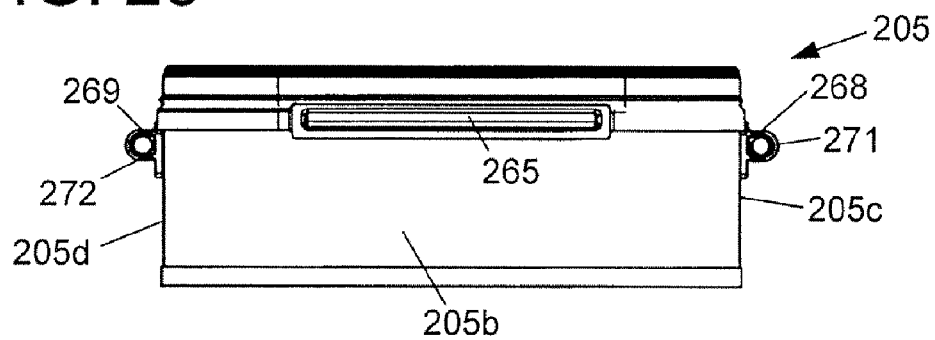

AIR CLEANER ARRANGEMENT; SERVICEABLE FILTER CARTRIDGE; AND, METHODS

CROSS-REFERENCE TO RELATED APPLICATIONS

The current application is a continuing application of U.S. Ser. No. 11/630,063, filed Dec. 18, 2006 as a National Stage of PCT/US2005/021255, filed Jun. 16, 2005, which has now issued as U.S. Pat. No. 8,048,188. The application includes the disclosures of, with edits: U.S. Ser. No. 11/630,063; U.S. Provisional Application No. 60/584,107 filed Jun. 30, 2004; U.S. Provisional Application No. 60/580,813 filed Jun. 18, 2004 and PCT/S2005/021255, filed Jun. 16, 2005 and published as WO 2006/009766. The complete disclosures of U.S. Ser. Nos. 11/630,063; 60/584,107; and, 60/580,813 and PCT/US2005/021255 are incorporated herein by reference. A claim of priority is made to the each of the filings, to the extent appropriate.

FIELD OF THE DISCLOSURE

This disclosure relates to air cleaners and to components for air cleaners. This disclosure particularly concerns air cleaners of a type useable for cleaning intake air for engines. Methods of assembly and use are also provided.

BACKGROUND

Fluid streams, such as air and liquid, can carry contaminant material therein. In many instances, it is desired to filter some or all of the contaminant material from the fluid stream. For example, air flow streams to engines (for example combustion air) for motorized vehicles or for power generation equipment, gas streams to gas turbine systems and air streams to various combustion furnaces, carry particulate contaminant therein that should be filtered. It is preferred for such systems, that selected contaminant material been removed from (or have its level reduced in) the fluid. A variety of fluid filter (for example air filter) arrangements have been developed for contaminant reduction. However, continued improvements are sought.

SUMMARY

The present disclosure relates to techniques and arrangements useable in association with air cleaners for vehicles and equipment, such as air cleaners for intake air to diesel powered systems. The techniques can be used together, for example as shown in the embodiments. However, it is not necessary for arrangements to utilize all of the techniques characterized herein, to obtain advantage from the present teachings.

One aspect of the present disclosure relates to a serviceable filter cartridge. The term "serviceable" in this context is meant to refer to a cartridge that is installed in, and then removed and replaced with respect to, an air cleaner in use. The preferred filter cartridge as disclosed comprises a z-filter media pack as described herein, defining inlet and outlet flow faces. The z-filter media pack generally comprises a plurality of inlet and outlet flutes, extending between opposite inlet and outlet flow faces.

Secured to the media pack, as selected for specific intended advantages, are various possible features. Included among these are: an outlet end perimeter band or rim; a grid arrangement across the outlet end of the media pack; a housing seal arrangement secured to the outlet end rim or band; an axial pivot arrangement, preferably positioned on a bottom of the filter cartridge during installation; and, a handle arrangement, preferably including a handle having an extended position and a retracted position. Preferably a strike plate is included at a top of the element, to engage the handle when in the retracted position. Also, preferably at the inlet end of the media pack there is provided a perimeter rim or band.

According to another aspect of the present disclosure, an air cleaner is provided, for use with a filter cartridge. The preferred air cleaner includes an inlet end and an outlet end, and an access or service cover. When the service cover is removed, the filter cartridge can be positioned in an inside of the housing. Cam or guide arrangements are provided along side walls of the housing, to engage the filter cartridge and facilitate insertion. Also provided in the housing is a pivot member, for engagement with the axial pivot arrangement on the filter cartridge during installation. In general, the pivot arrangements are positioned such that: there is no engagement between them until after the filter cartridge has been inserted into the housing; and, once engaged the filter cartridge can be rocked into a sealed position or tilted back out of that sealed position, with a point for leverage being the location of engagement between the pivot arrangements.

Also provided are methods for installation and removal, using the general techniques characterized previously.

BRIEF DESCRIPTION OF THE DRAWINGS

FIG. 13 is a side elevational view filter cartridge depicted in FIG. 12.

FIG. 14 is a fragmentary schematic view depicting filter cartridge of FIG. 13 during a step of installation in the air cleaner assembly of FIG. 6.

FIG. 15 is a schematic view analogous to FIG. 14, after complete installation and sealing.

FIG. 21 is an outlet end elevational view of a filter cartridge of FIG. 12.

FIG. 22 is a top plan view of the filter cartridge of FIG. 21.

FIG. 23 is a bottom plan view of the filter cartridge of FIG. 21.

DETAILED DESCRIPTION

Figure 1:
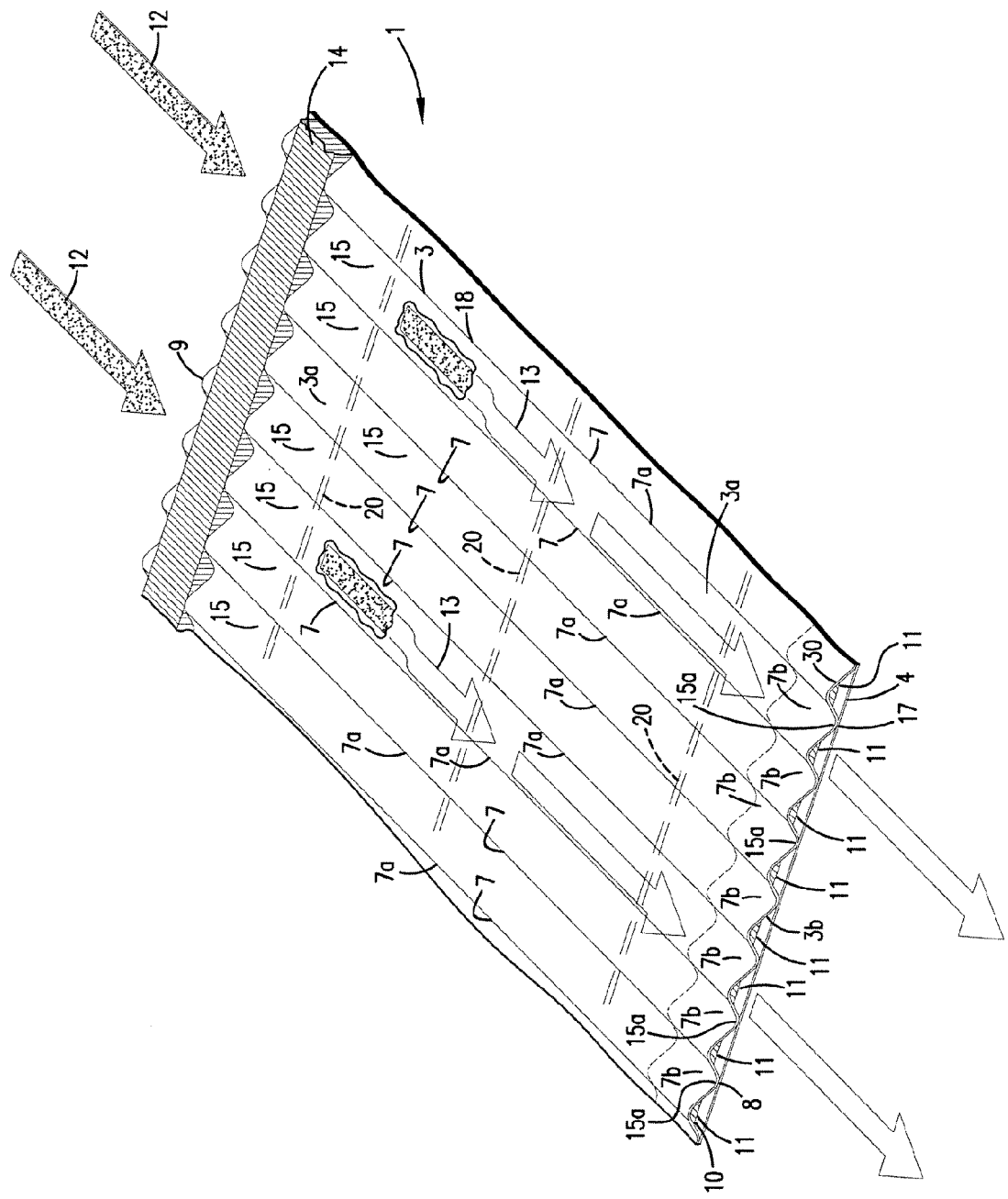
FIG. 1 is a fragmentary, schematic, perspective view of an example of z-filter media useable in arrangements according to the present disclosure.

I. Z-Filter Media Configurations, Generally.

Fluted filter media can be used to provide fluid filter constructions in a variety of manners. One well known manner is as a z-filter construction. The term "z-filter construction" as used herein, is meant to refer to a filter construction in which individual ones of corrugated, folded or otherwise formed filter flutes are used to define sets of longitudinal, typically parallel, inlet and outlet filter flutes for fluid flow through the media; the fluid flowing along the length of the flutes between opposite inlet and outlet flow ends (or flow faces) of the media. Some examples of z-filter media are provided in U.S. Pat. Nos. 5,820,646; 5,772,883; 5,902,364; 5,792,247; 5,895,574; 6,210,469; 6,190,432; 6,350,296; 6,179,890; 6,235,195; Des. 399,944; Des. 428,128; Des. 396,098; Des. 398,046; and, Des. 437,401; each of these fifteen cited references being incorporated herein by reference.

One type of z-filter media, utilizes two specific media components joined together, to form the media construction. The two components are: (1) a fluted (typically corrugated) media sheet; and, (2) a facing media sheet. The facing media sheet is typically non-corrugated, however it can be corrugated, for example perpendicularly to the flute direction as described in U.S. provisional 60/543,804, filed Feb. 11, 2004, incorporated herein by reference. The facing sheet may sometimes be characterized as flat, even when it is coiled in the filter construction.

The fluted (typically corrugated) media sheet and the facing media sheet together, are used to define media having parallel inlet and outlet flutes. In some instances, the fluted sheet and non-fluted sheet are secured together and are then coiled to form a z-filter media construction. Such arrangements are described, for example, in U.S. Pat. Nos. 6,235,195 and 6,179,890, each of which is incorporated herein by reference. In certain other arrangements, some non-coiled sections of corrugated media secured to facing media, are stacked on one another, to create a filter construction. An example of this is described in FIG. 11 of U.S. Pat. No. 5,820,646, incorporated herein by reference.

For specific applications as described herein, coiled arrangements are preferred.

Typically, coiling of the fluted sheet/facing sheet combination around itself, to create a coiled media pack, is conducted with the facing sheet directed outwardly. Some techniques for coiling are described in U.S. provisional application 60/467,521, filed May 2, 2003 and PCT Application US 04/07927, filed Mar. 17, 2004, each of which is incorporated herein by reference. The resulting coiled arrangement generally has, as the outer surface of the media pack, a portion of the facing sheet, as a result.

The term "corrugated" used herein to refer to structure in media, is meant to refer to a flute structure resulting from passing the media between two corrugation rollers, i.e., into a nip or bite between two rollers, each of which has surface features appropriate to cause a corrugation affect in the resulting media. The term "corrugation" is not meant to refer to flutes that are formed by techniques not involving passage of media into a bite between corrugation rollers. However, the term "corrugated" is meant to apply even if the media is further modified or deformed after corrugation, for example by the folding techniques described in PCT WO 04/007054, published Jan. 22, 2004, incorporated herein by reference.

Corrugated media is a specific form of fluted media. Fluted media is media which has individual flutes (for example formed by corrugating or alternatively folding) extending thereacross.

Serviceable filter element or filter cartridge configurations utilizing z-filter media are sometimes referred to as "straight through flow configurations" or by variants thereof. In general, in this context what is meant is that the serviceable filter elements generally have an inlet flow end (or face) and an opposite exit flow end (or face), with flow entering and exiting the filter cartridge in generally the same straight through direction, referenced herein as an axial direction. The term "serviceable" in this context is meant to refer to a media containing filter cartridge that is periodically removed and replaced from a corresponding fluid cleaner. In some instances, each of the inlet flow end and outlet flow end will be generally flat or planar, with the two parallel to one another. However, variations from this, for example non-planar faces, are possible.

A straight through flow configuration (especially for a coiled media pack) is, for example, in contrast to serviceable filter cartridges such as cylindrical pleated filter cartridges of the type shown in U.S. Pat. No. 6,039,778, incorporated herein by reference, in which the flow generally makes a turn as its passes through the serviceable cartridge. That is, in a U.S. Pat. No. 6,039,778 filter, the flow enters the cylindrical filter cartridge through a cylindrical side, and then turns to exit through an end face (in forward-flow systems). In a typical reverse-flow system, the flow enters the serviceable cylindrical cartridge through an end face and then turns to exit through a side of the cylindrical filter cartridge. An example of such a reverse-flow system is shown in U.S. Pat. No. 5,613,992, incorporated by reference herein.

The term "z-filter media construction" and variants thereof as used herein, without more, is meant to refer to any or all of: a web of corrugated or otherwise fluted media secured to (facing) media with appropriate sealing to allow for definition of inlet and outlet flutes; or, such a media coiled or otherwise constructed or formed into a three dimensional network of inlet and outlet flutes; and/or, a filter construction including such media.

In FIG. 1, an example of media 1 useable as z-filter media is shown. The media 1 is formed from a corrugated sheet 3 and a facing sheet 4.

In general, the corrugated sheet 3, FIG. 1 is of a type generally characterized herein as having a regular, curved, wave pattern of flutes or corrugations 7. The term "wave pattern" in this context, is meant to refer to a flute or corrugated pattern of alternating troughs 7b and ridges 7a. The term "regular" in this context is meant to refer to the fact that the pairs of troughs and ridges (7b, 7a) alternate with generally the same repeating corrugation (or flute) shape and size. (Also, typically in a regular configuration each trough 7b is substantially an inverse of each ridge 7a.) The term "regular" is thus meant to indicate that the corrugation (or flute) pattern comprises troughs and ridges with each pair (comprising an adjacent trough and ridge) repeating, without substantial modification in size and shape of the corrugations along at least 70% of the length of the flutes. The term "substantial" in this context, refers to a modification resulting from a change in the process or form used to create the corrugated or fluted sheet, as opposed to minor variations from the fact that the media sheet 3 is flexible. With respect to the characterization of a repeating pattern, it is not meant that in any given filter construction, an equal number of ridges and troughs is necessarily present. The media 1 could be terminated, for example, between a pair comprising a ridge and a trough, or partially along a pair comprising a ridge and a trough. (For example, in FIG. 1 the media 1 depicted in fragmentary has eight complete ridges 7a and seven complete troughs 7b.) Also, the opposite flute ends (ends of the troughs and ridges) may vary from one another. Such variations in ends are disregarded in these definitions, unless specifically stated. That is, variations in the ends of flutes are intended to be covered by the above definitions.

In the context of the characterization of a "curved" wave pattern of corrugations, the term "curved" is meant to refer to a corrugation pattern that is not the result of a folded or creased shape provided to the media, but rather the apex 7a of each ridge and the bottom 7b of each trough is formed along a radiused curve. Although alternatives are possible, a typical radius for such z-filter media would be at least 0.25 mm and typically would be not more than 3 mm.

An additional characteristic of the particular regular, curved, wave pattern depicted in FIG. 1, for the corrugated sheet 3, is that at approximately a midpoint 30 between each trough and each adjacent ridge, along most of the length of the flutes 7, is located a transition region where the curvature inverts. For example, viewing back side or face 3a, FIG. 1, trough 7b is a concave region, and ridge 7a is a convex region. Of course when viewed toward front side or face 3b, trough 7b of side 3a forms a ridge; and, ridge 7a of face 3a, forms a trough. (In some instances, region 30 can be a straight segment, instead of a point, with curvature inverting at ends of the segment 30.)

A characteristic of the particular regular, curved, wave pattern corrugated sheet 3 shown in FIG. 1, is that the individual corrugations are generally straight. By "straight" in this context, it is meant that through at least 70%, typically at least 80% of the length between edges 8 and 9, the ridges 7a and troughs 7b do not change substantially in cross-section. The term "straight" in reference to corrugation pattern shown in FIG. 1, in part distinguishes the pattern from the tapered flutes of corrugated media described in FIG. 1 of WO 97/40918 and PCT Publication WO 03/47722, published Jun. 12, 2003, incorporated herein by reference. The tapered flutes of FIG. 1 of WO 97/40918, for example, would be a curved wave pattern, but not a "regular" pattern, or a pattern of straight flutes, as the terms are used herein.

Referring to the present FIG. 1 and as referenced above, the media 1 has first and second opposite edges 8 and 9. When the media 1 is coiled and formed into a media pack, in general edge 9 will form an inlet end for the media pack and edge 8 an outlet end, although an opposite orientation is possible.

Although alternatives are possible, adjacent edge 8 is provided a sealant bead 10, sealing the corrugated sheet 3 and the facing sheet 4 together. Bead 10 will sometimes be referred to as a "single facer" bead, since it is a bead between the corrugated sheet 3 and facing sheet 4, which forms the single facer or media strip 1. Sealant bead 10 seals closed individual flutes 11 adjacent edge 8, to passage of air therefrom. (Bead 14 could alternatively be the single facer bead, and often would be.)

Although alternatives are possible, adjacent edge 9, is provided seal bead 14. Seal bead 14 generally closes flutes 15 to passage of unfiltered fluid therein, adjacent edge 9. Bead 14 would typically be applied as the media 1 is coiled about itself, with the corrugated sheet 3 directed to the inside. Thus bead 14 will form a seal between a back side 17 of facing sheet 4, and side 18 of the corrugated sheet 3. The bead 14 will sometimes be referred to as a "winding bead" since it is typically applied, as the strip 1 is coiled into a coiled media pack. If the media 1 is cut in strips and stacked, instead of coiled, bead 14 would be a "stacking bead." (In some instances bead 14 would be a single facer bead, and bead 10 the winding or stacking bead.)

Referring to FIG. 1, once the media 1 is incorporated into a media pack, for example by coiling or stacking, it can be operated as follows. First, air in the direction of arrows 12, would enter open flutes 11 adjacent end 9. Due to the closure at end 8, by bead 10, the air would pass through the media shown by arrows 13. It could then exit the media pack, by passage through open ends 15a of the flutes 15, adjacent end 8 of the media pack. Of course operation could be conducted with air flow in the opposite direction.

For the particular arrangement shown herein in FIG. 1, the parallel corrugations 7a, 7b are generally straight completely across the media, from edge 8 to edge 9. Straight flutes or corrugations can be deformed or folded at selected locations, especially at ends. Modifications at flute ends for closure are generally disregarded in the above definitions of "regular," "curved" and "wave pattern."

Z-filter constructions which do not utilize straight, regular curved wave pattern corrugation shapes are known. For example in Yamada et al. U.S. Pat. No. 5,562,825 corrugation patterns which utilize somewhat semicircular (in cross section) inlet flutes adjacent narrow V-shaped (with curved sides) exit flutes are shown (see FIGS. 1 and 3, of U.S. Pat. No. 5,562,825). In Matsumoto, et al. U.S. Pat. No. 5,049,326 circular (in cross-section) or tubular flutes defined by one sheet having half tubes attached to another sheet having half tubes, with flat regions between the resulting parallel, straight, flutes are shown, see FIG. 2 of Matsumoto '326. In Ishii, et al. U.S. Pat. No. 4,925,561 (FIG. 1) flutes folded to have a rectangular cross section are shown, in which the flutes taper along their lengths. In WO 97/40918 (FIG. 1), flutes or parallel corrugations which have a curved, wave patterns (from adjacent curved convex and concave troughs) but which taper along their lengths (and thus are not straight) are shown. Also, in WO 97/40918 flutes which have curved wave patterns, but with different sized ridges and troughs, are shown.

In general, the filter media is a relatively flexible material, typically a non-woven fibrous material (of cellulose fibers, synthetic fibers or both) often including a resin therein, sometimes treated with additional materials. Thus, it can be conformed or configured into the various corrugated patterns, without unacceptable media damage. Also, it can be readily coiled or otherwise configured for use, again without unacceptable media damage. Of course, it must be of a nature such that it will maintain the required corrugated configuration, during use.

In the corrugation process, an inelastic deformation is caused to the media. This prevents the media from returning to its original shape. However, once the tension is released the flute or corrugations will tend to spring back, recovering only a portion of the stretch and bending that has occurred. The facing sheet is sometimes tacked to the fluted sheet, to inhibit this spring back in the corrugated sheet.

Also, typically, the media contains a resin. During the corrugation process, the media can be heated to above the glass transition point of the resin. When the resin then cools, it will help to maintain the fluted shapes.

The media of the corrugated sheet 3 facing sheet 4 or both, can be provided with a fine fiber material on one or both sides thereof, for example in accord with U.S. Pat. No. 6,673,136, incorporated herein by reference.

An issue with respect to z-filter constructions relates to closing of the individual flute ends. Typically a sealant or adhesive is provided, to accomplish the closure. As is apparent from the discussion above, in typical z-filter media, especially that which uses straight flutes as opposed to tapered flutes, large sealant surface areas (and volume) at both the upstream end and the downstream end are needed. High quality seals at these locations are critical to proper operation of the media structure that results. The high sealant volume and area, creates issues with respect to this.

Figure 2:
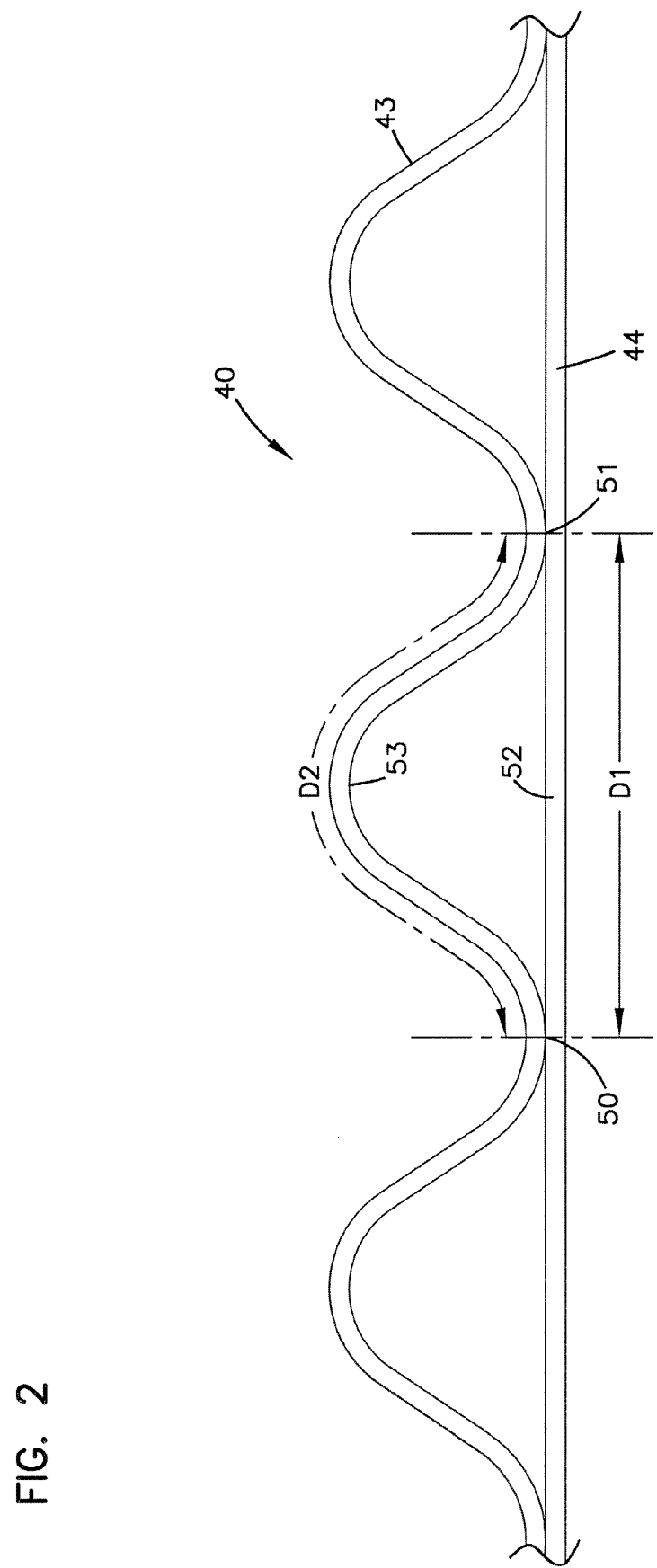
FIG. 2 is a schematic, cross-sectional view of a portion of the media depicted in FIG. 1.

Attention is now directed to FIG. 2, in which a z-filter media construction 40 utilizing a regular, curved, wave pattern corrugated sheet 43, and a non-corrugated flat sheet 44, is depicted. The distance D1, between points 50 and 51, defines the extension of flat media 44 in region 52 underneath a given corrugated flute 53. The length D2 of the arcuate media for the corrugated flute 53, over the same distance D1, is, of course, larger than D1, due to the shape of the corrugated flute 53. For a typical regular shaped media used in fluted filter applications, the linear length D2 of the media 53 between points 50 and 51 will generally be at least 1.2 times D1. Typically, D2 would be within a range of 1.2-2.0, inclusive. One particularly convenient arrangement for air filters has a configuration in which D2 is about 1.25-1.35×D1. Such media has, for example, been used commercially in Donaldson Powercore™ Z-filter arrangements. Herein the ratio D2/D1 will sometimes be characterized as the flute/flat ratio or media draw for the corrugated media.

Figure 3:
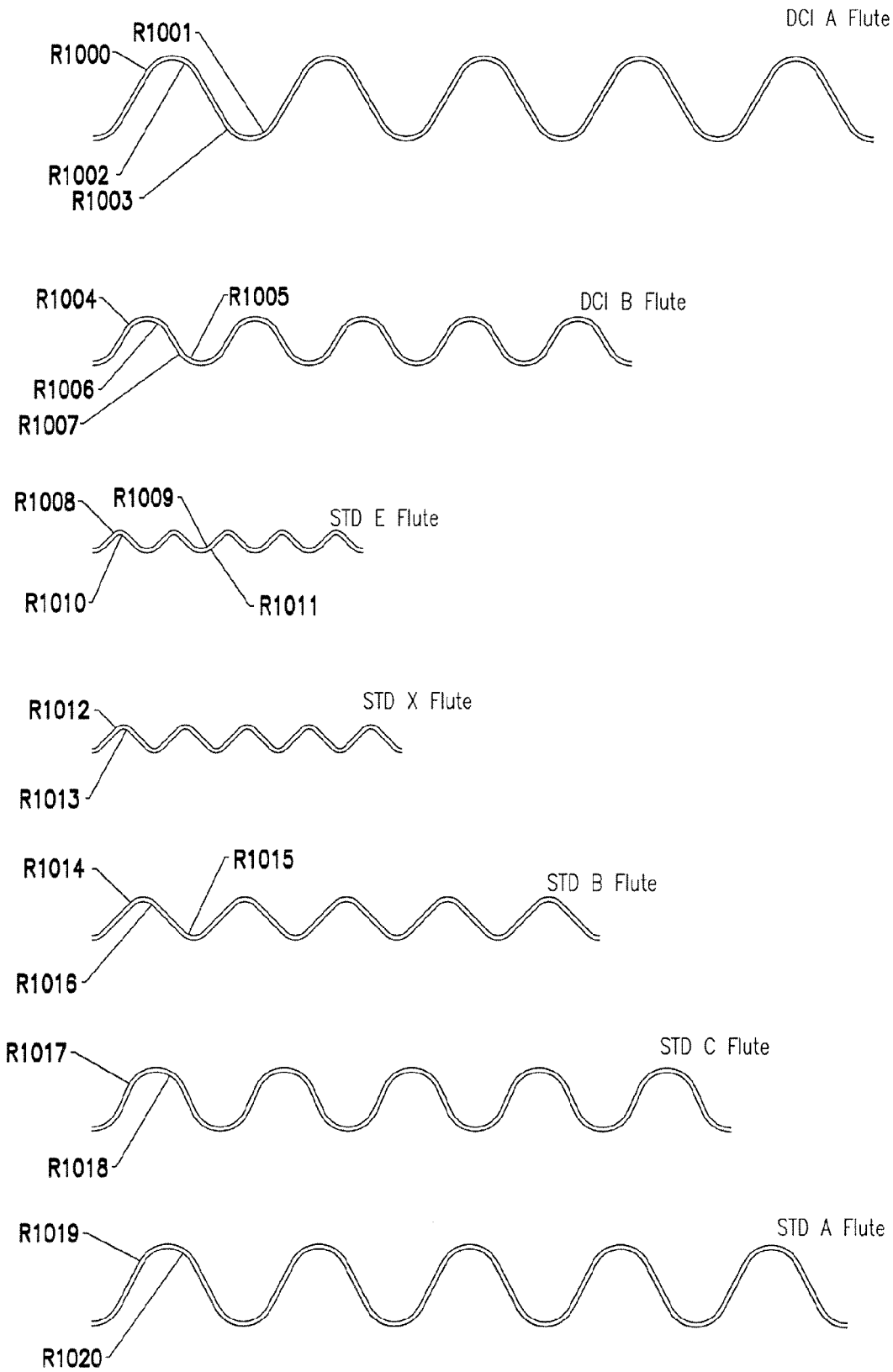
FIG. 3 is a schematic view of examples of various corrugated media definitions.

In the corrugated cardboard industry, various standard flutes have been defined. For example the standard E flute, standard X flute, standard B flute, standard C flute and standard A flute. FIG. 3, attached, in combination with Table A below provides definitions of these flutes.

Donaldson Company, Inc., (DCI) the assignee of the present disclosure, has used variations of the standard A and standard B flutes, in a variety of z-filter arrangements. These flutes are also defined in Table A and FIG. 3.

TABLE A (Flute definitions for FIG. 3)

| | |
|---|---|
| DCI A Flute: | Flute/flat = 1.52:1; The Radii (R) are as follows:<br>R1000 = .0675 inch (1.715 mm);<br>R1001 = .0581 inch (1.476 mm);<br>R1002 = .0575 inch (1.461 mm);<br>R1003 = .0681 inch (1.730 mm); |
| DCI B Flute: | Flute/flat = 1.32:1; The Radii (R) are as follows:<br>R1004 = .0600 inch (1.524 mm);<br>R1005 = .0520 inch (1.321 mm);<br>R1006 = .0500 inch (1.270 mm);<br>R1007 = .0620 inch (1.575 mm); |
| Std. E Flute: | Flute/flat = 1.24:1; The Radii (R) are as follows:<br>R1008 = .0200 inch (.508 mm);<br>R1009 = .0300 inch (.762 mm);<br>R1010 = .0100 inch (.254 mm);<br>R1011 = .0400 inch (1.016 mm); |
| Std. X Flute: | Flute/flat = 1.29:1; The Radii (R) are as follows:<br>R1012 = .0250 inch (.635 mm);<br>R1013 = .0150 inch (.381 mm); |
| Std. B Flute: | Flute/flat = 1.29:1; The Radii (R) are as follows:<br>R1014 = .0410 inch (1.041 mm);<br>R1015 = .0310 inch (.7874 mm);<br>R1016 = .0310 inch (.7874 mm); |
| Std. C Flute: | Flute/flat = 1.46:1; The Radii (R) are as follows:<br>R1017 = .0720 inch (1.829 mm);<br>R1018 = .0620 inch (1.575 mm); |
| Std. A Flute: | Flute/flat = 1.53:1; The Radii (R) are as follows:<br>R1019 = .0720 inch (1.829 mm);<br>R1020 = .0620 inch (1.575 mm). |

Of course other, standard, flutes definitions from the corrugated box industry are known.

In general, standard flute configurations from the corrugated box industry can be used to define corrugation shapes or approximate corrugation shapes for corrugated media. Comparisons above between the DCI A flute and DCI B flute, and the corrugation industry standard A and standard B flutes, indicate some convenient variations.

II. Manufacture of Coiled Media Configurations Using Fluted Media, Generally.

Figure 4:
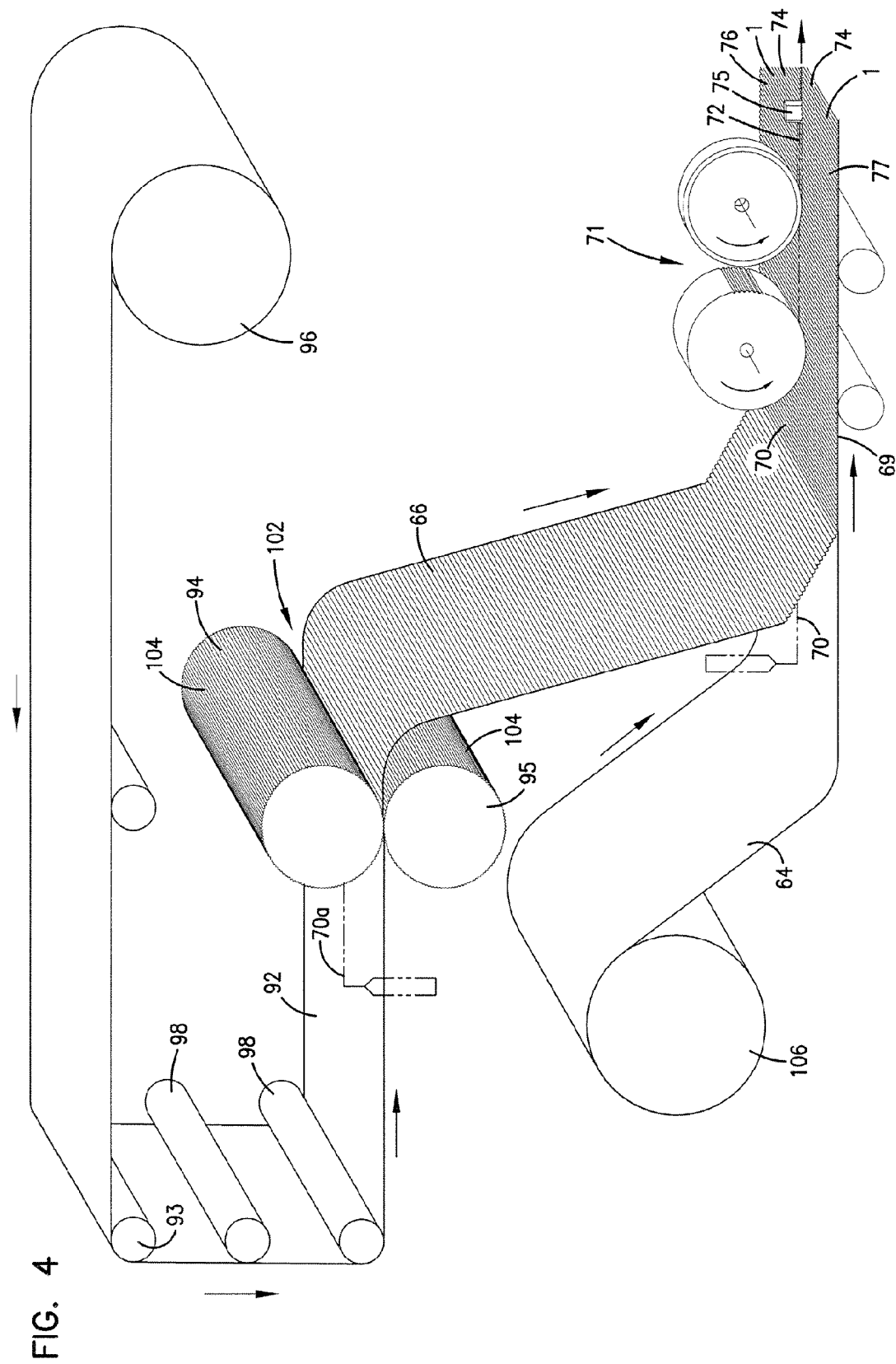
FIG. 4 is a schematic view of a process for manufacturing media according to the present disclosure.

In FIG. 4, one example of a manufacturing process for making a media strip corresponding to strip 1, FIG. 1 is shown. In general, facing sheet 64 and the fluted (corrugated) sheet 66 having flutes 68 are brought together to form a media web 69, with an adhesive bead located therebetween at 70. The adhesive bead 70 will form a single facer bead. An optional darting process occurs at station 71 to form center darted section 72 located mid-web. The z-filter media or Z-media strip 74 can be cut or slit at 75 along the bead 70 to create two pieces 76, 77 of z-filter media 74, each of which has an edge with a strip of sealant (single facer bead) extending between the corrugating and facing sheet. Of course, if the optional darting process is used, the edge with a strip of sealant (single facer bead) would also have a set of flutes darted at this location.

Techniques for conducting a process as characterized with respect to FIG. 4 are described in PCT WO 04/007054, published Jan. 22, 2004 incorporated herein by reference.

Still in reference to FIG. 4, before the z-filter media 74 is put through the darting station 71 and eventually slit at 75, it must be formed. In the schematic shown in FIG. 4, this is done by passing a sheet of media 92 through a pair of corrugation rollers 94, 95. In the schematic shown in FIG. 4, the sheet of media 92 is unrolled from a roll 96, wound around tension rollers 98, and then passed through a nip or bite 102 between the corrugation rollers 94, 95. The corrugation rollers 94, 95 have teeth 104 that will give the general desired shape of the corrugations after the sheet 92 passes through the nip 102. After passing through the nip 102, the sheet 92 becomes corrugated and is referenced at 66 as the corrugated sheet. The corrugated sheet 66 is then secured to facing sheet 64. (The corrugation process may involve heating the media, in some instances.)

Still in reference to FIG. 4, the process also shows the facing sheet 64 being routed to the darting process station 71. The facing sheet 64 is depicted as being stored on a roll 106 and then directed to the corrugated sheet 66 to form the Z-media 74. The corrugated sheet 66 and the facing sheet 64 are secured together by adhesive and/or by other means (for example by sonic welding).

Referring to FIG. 4, an adhesive line 70 is shown used, to secure corrugated sheet 66 and facing sheet 64 together, as the sealant bead. Alternatively, the sealant bead for forming the facing bead could be applied as shown as 70*a*. If the sealant is applied at 70*a*, it may be desirable to put a gap in the corrugation roller 95, and possibly in both corrugation rollers 94, 95, to accommodate the bead 70*a*.

The type of corrugation provided to the corrugated media is a matter of choice, and will be dictated by the corrugation or corrugation teeth of the corrugation rollers 94, 95. One preferred corrugation pattern will be a regular curved wave pattern corrugation, of straight flutes, as defined herein above. A typical regular curved wave pattern used, would be one in which the distance D2, as defined above, in a corrugated pattern is at least 1.2 times the distance D1 as defined above. In one preferred application, typically D2=1.25-1.35×D1. In some instances the techniques may be applied with curved wave patterns that are not "regular," including, for example, ones that do not use straight flutes.

Figure 5:
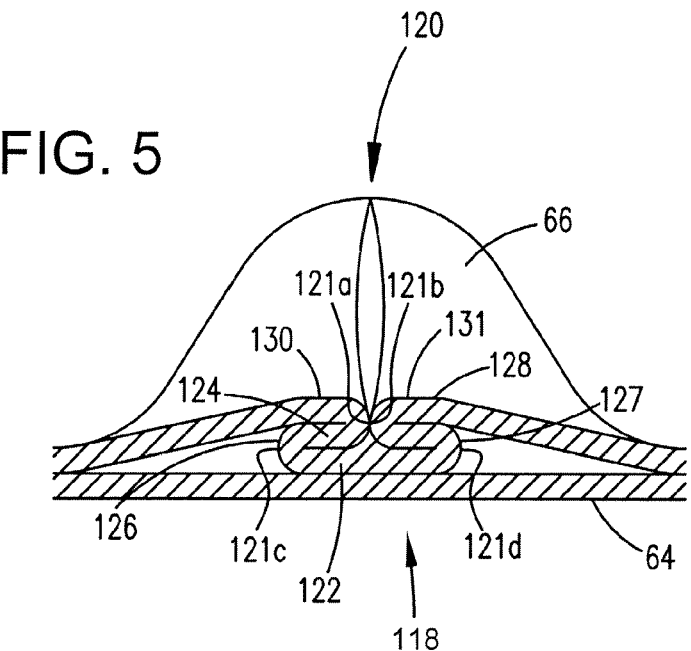
FIG. 5 is a cross-sectional view of an optional end dart for media flutes useable in arrangements according to the present disclosure.

As described, the process shown in FIG. 4 can be used to create the center darted section 72. FIG. 5 shows, in cross-section, one of the flutes 68 after darting and slitting.

A fold arrangement 118 can be seen to form a darted flute 120 with four creases 121*a*, 121*b*, 121*c*, 121*d*. The fold arrangement 118 includes a flat first layer or portion 122 that is secured to the facing sheet 64. A second layer or portion 124 is shown pressed against the first layer or portion 122. The second layer or portion 124 is preferably formed from folding opposite outer ends 126, 127 of the first layer or portion 122.

Still referring to FIG. 5, two of the folds or creases 121*a*, 121*b* will generally be referred to herein as "upper, inwardly directed" folds or creases. The term "upper" in this context is meant to indicate that the creases lie on an upper portion of the entire fold 120, when the fold 120 is viewed in the orientation of FIG. 5. The term "inwardly directed" is meant to refer to the fact that the fold line or crease line of each crease 121*a*, 121*b*, is directed toward the other.

In FIG. 5, creases 121*c*, 121*d*, will generally be referred to herein as "lower, outwardly directed" creases. The term "lower" in this context refers to the fact that the creases 121*c*, 121*d* are not located on the top as are creases 121*a*, 121*b*, in the orientation of FIG. 5. The term "outwardly directed" is meant to indicate that the fold lines of the creases 121*c*, 121*d* are directed away from one another.

The terms "upper" and "lower" as used in this context are meant specifically to refer to the fold 120, when viewed from the orientation of FIG. 5. That is, they are not meant to be otherwise indicative of direction when the fold 120 is oriented in an actual product for use.

Based upon these characterizations and review of FIG. 5, it can be seen that a preferred regular fold arrangement 118 according to FIG. 5 in this disclosure is one which includes at least two "upper, inwardly directed, creases." These inwardly directed creases are unique and help provide an overall arrangement in which the folding does not cause a significant encroachment on adjacent flutes.

A third layer or portion 128 can also be seen pressed against the second layer or portion 124. The third layer or portion 128 is formed by folding from opposite inner ends 130, 131 of the third layer 128.

Another way of viewing the fold arrangement 118 is in reference to the geometry of alternating ridges and troughs of the corrugated sheet 66. The first layer or portion 122 is formed from an inverted ridge. The second layer or portion 124 corresponds to a double peak (after inverting the ridge) that is folded toward, and in preferred arrangements, folded against the inverted ridge.

Techniques for providing the optional dart described in connection with FIG. 5, in a preferred manner, are described in PCT WO 04/007054, incorporated herein by reference. Techniques for coiling the media, with application of the winding bead, are described in PCT application US 04/07927, filed Mar. 17, 2004, incorporated herein by reference.

Techniques described herein are particularly well adapted for use in media packs that result from coiling a single sheet comprising a corrugated sheet/facing sheet combination, i.e., a "single facer" strip. Certain of the techniques can be applied with arrangements that, instead of being formed by coiling, are formed from a plurality of strips of single facer.

Coiled media pack arrangements can be provided with a variety of peripheral perimeter definitions. In this context the term "peripheral, perimeter definition" and variants thereof, is meant to refer to the outside perimeter shape defined, looking at either the inlet end or the outlet end of the media pack. Typical shapes are circular as described in PCT WO 04/007054 and PCT application US 04/07927. Other useable shapes are ob round, some examples of ob round being oval shape. In general oval shapes have opposite curved ends attached by a pair of opposite sides. In some oval shapes, the opposite sides are also curved. In other oval shapes, sometimes called racetrack shapes, the opposite sides are generally straight. Racetrack shapes are described for example in PCT WO 04/007054 and PCT application US 04/07927. In another shape described below in connection with FIG. 11A, the coil has four sides and four corners, forming a square or rectangular cross-section with rounded corners.

Another way of describing the peripheral or perimeter shape is by defining the perimeter resulting from taking a cross-section through the media pack in a direction orthogonal to the winding axis of the coil.

The flute seals (single facer bead, winding bead or stacking bead) can be formed from a variety of materials. In various ones of the cited and incorporated references, hot melt or polyurethane seals are described as possible for various applications.

III. An Example Air Cleaner Assembly

A. General Features of the Air Cleaner Assembly.

Figure 6:
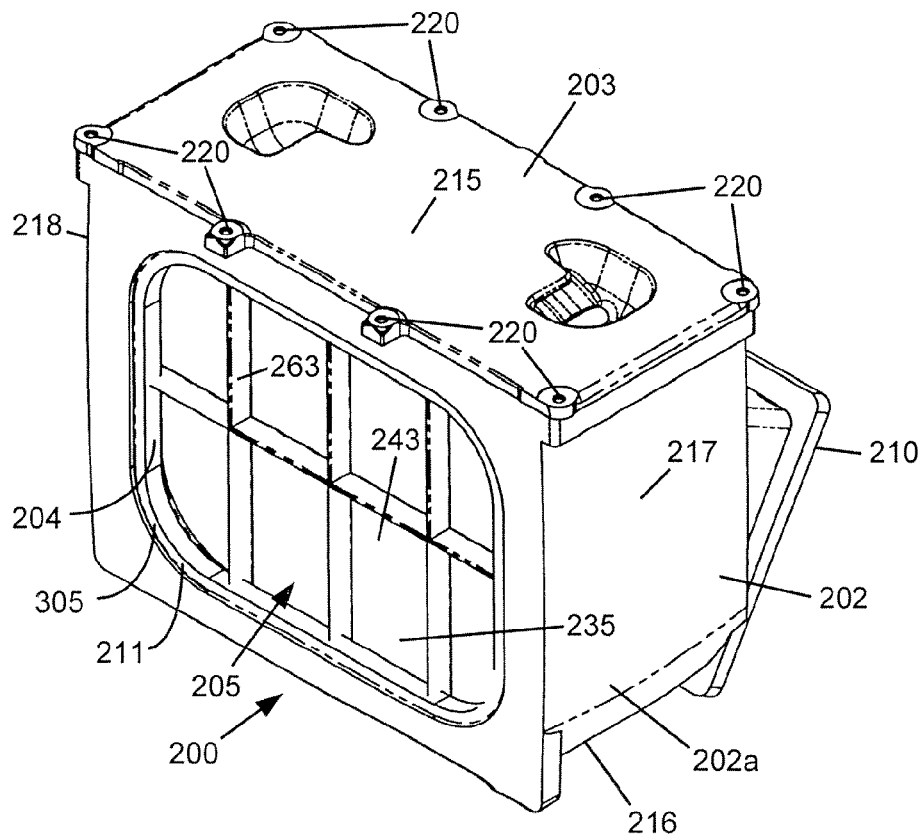
FIG. 6 is an upper outlet end perspective view of an air cleaner assembly according to the present disclosure.

The reference numeral 200, FIG. 6, generally depicts an air cleaner assembly according to the present disclosure. The air cleaner assembly 200 comprises a housing 202 having a base 202a with a removable access or service cover 203 thereon, for service access to an interior 204 of the housing 202. Operably positioned within the housing interior 204 is a serviceable filter cartridge 205. By "serviceable" in this context, it is meant that the filter cartridge 205 can be removed and be replaced within housing 202 as required.

In general, the housing 202 includes an air flow inlet end opening 210 and an air flow outlet end opening 211. During operation, air to be filtered enters housing 202 through opening 210; and, filtered air, after passage through filter cartridge 205, leaves the housing 202 through outlet opening 211.

Although alternatives are possible, the particular housing 202 depicted, has a generally rectangular cross-section with: top 215 (comprising access cover 203) and opposite bottom 216; and side 217 with opposite side 218. The determination of configuration, both external and internal, will generally be a matter of choice for the particular application involved and the space in which the air cleaner assembly 200 must be configured to fit. It is noted that for the particular air cleaner assembly 200 depicted, the housing interior 204 geometry also generally reflects the external geometry with: opposite internal top and bottom faces; and opposite internal sides.

For the embodiment depicted in FIG. 6, inlet opening 210 is in a plane not parallel to the plane of the outlet opening 211. This is a configuration preferred for a particular example of use, although alternatives are possible. For example, for some arrangements, the inlet and outlet openings could be in planes parallel to one another.

Still referring to FIG. 6, the particular cover 203 shown, includes a plurality of bolt holes 220 thereon, to receive bolts securing cover 203 in place on housing base 202a. A variety of alternate arrangements, depending on the system, can be used to retain a service cover 203 in place on a remainder of the housing 202.

Figure 7:
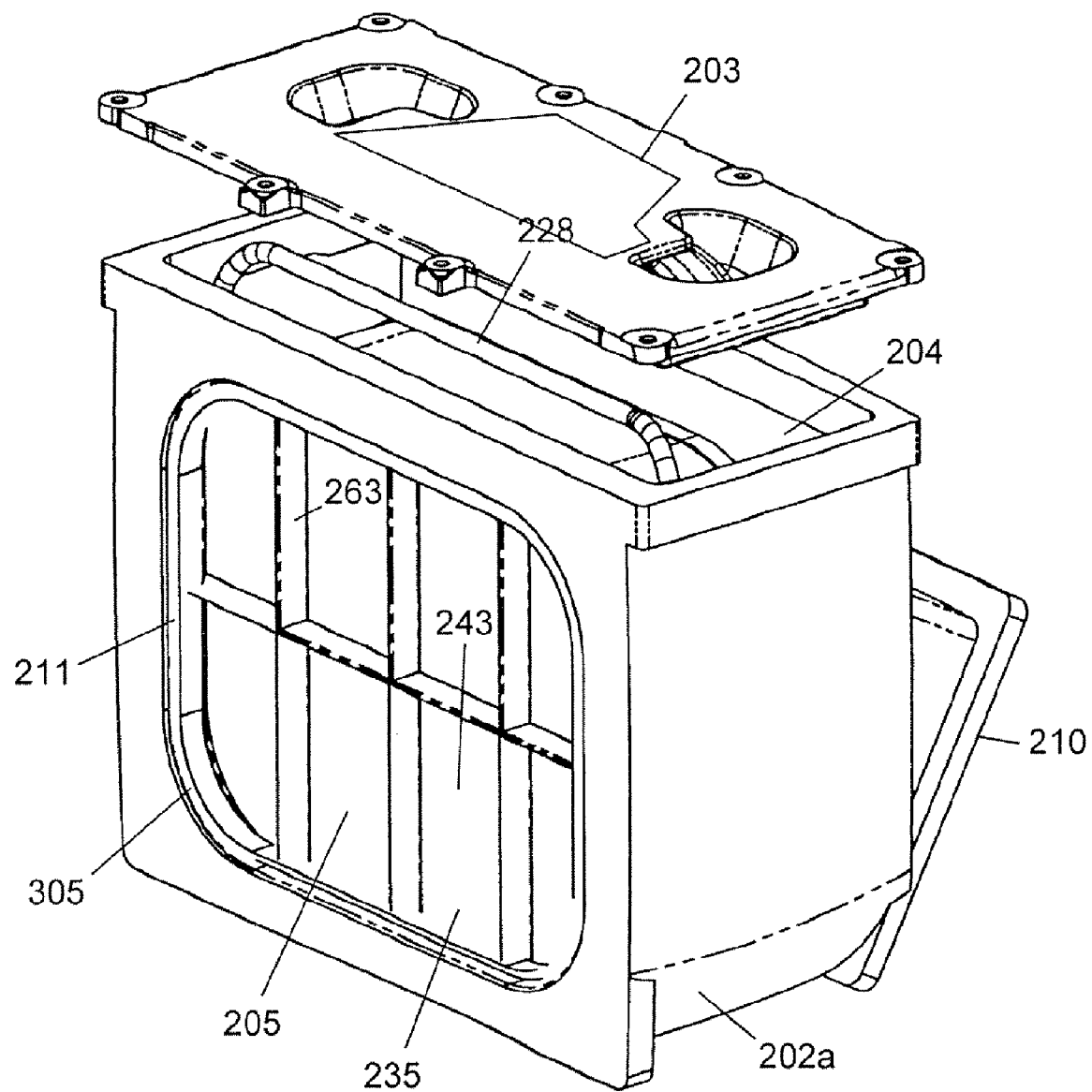
FIG. 7 is a view analogous to FIG. 6, depicting the air cleaner assembly with a service or access cover removed.
Figure 8:
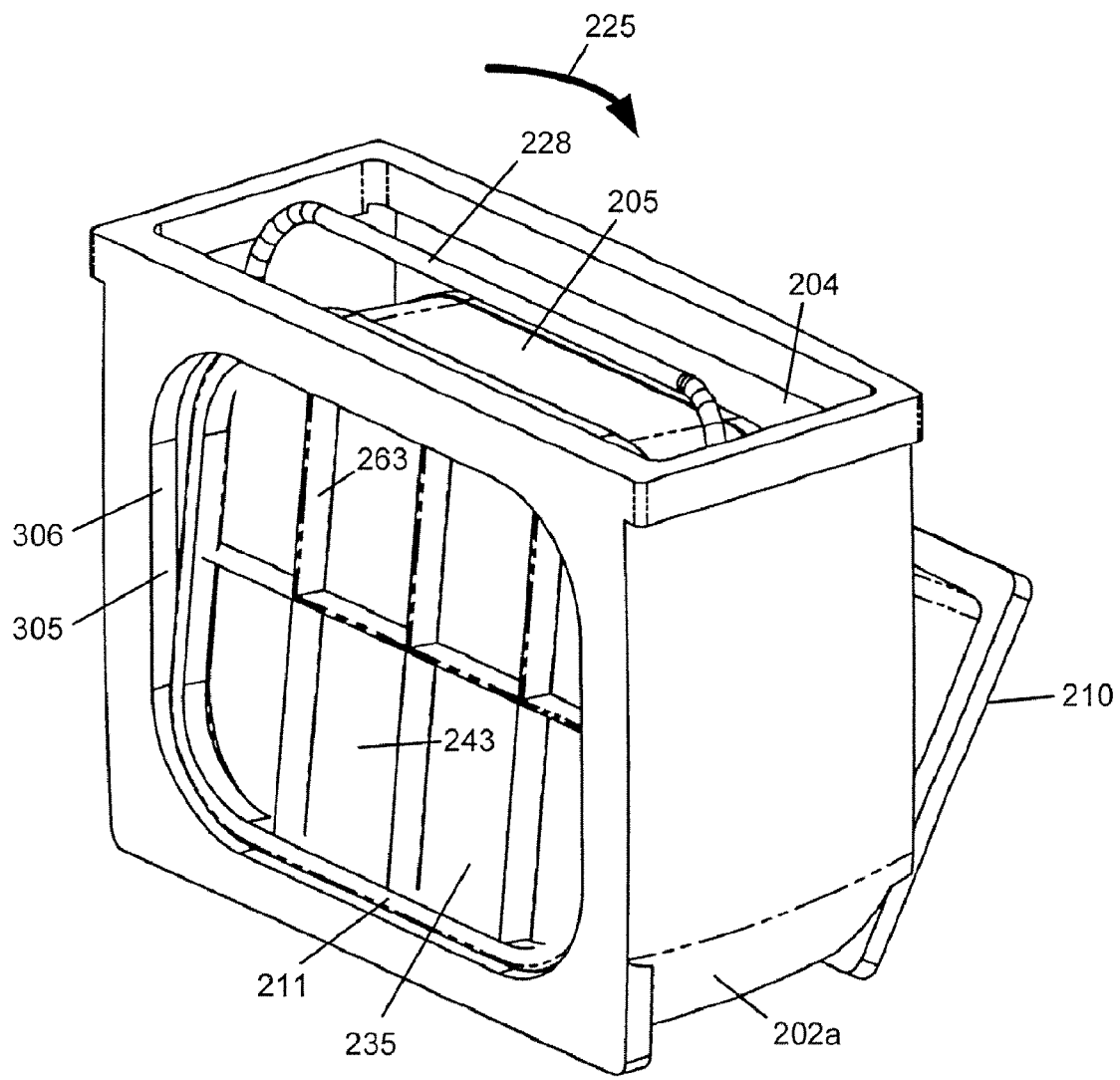
FIG. 8 is a depiction of the air cleaner assembly of FIGS. 6 and 7, with an access cover removed and showing a first step of removing an internally received serviceable filter cartridge from the air cleaner assembly, after the service cover is removed.

From review of FIGS. 6-10, a step of servicing air cleaner assembly 200, relating to removal of an internally received filter cartridge 205, will be understood. In FIG. 7 assembly 200 is depicted with service cover 203 removed. In FIG. 8, the assembly 200 is depicted not only with the service cover removed, but with the filter cartridge 205 axially tipped back (or axially rocked back) in the general direction of arrow 225, out of full sealing engagement with housing base 202a. Herein, a tip or rock of the filter cartridge 205 from the position shown in FIG. 7 to the position shown in FIG. 8, will generally be referred to as a rearward axial tilt, tip or rock or upstream axial tilt, tip or rock or by a variant thereof. Movement in the opposite direction from the position shown in FIG. 8, i.e., to the position shown in FIG. 7, will sometimes be referred to as a forward axial tilt, tip or rock or downstream axial tilt, tip or rock or by a variant thereof.

Figure 9:
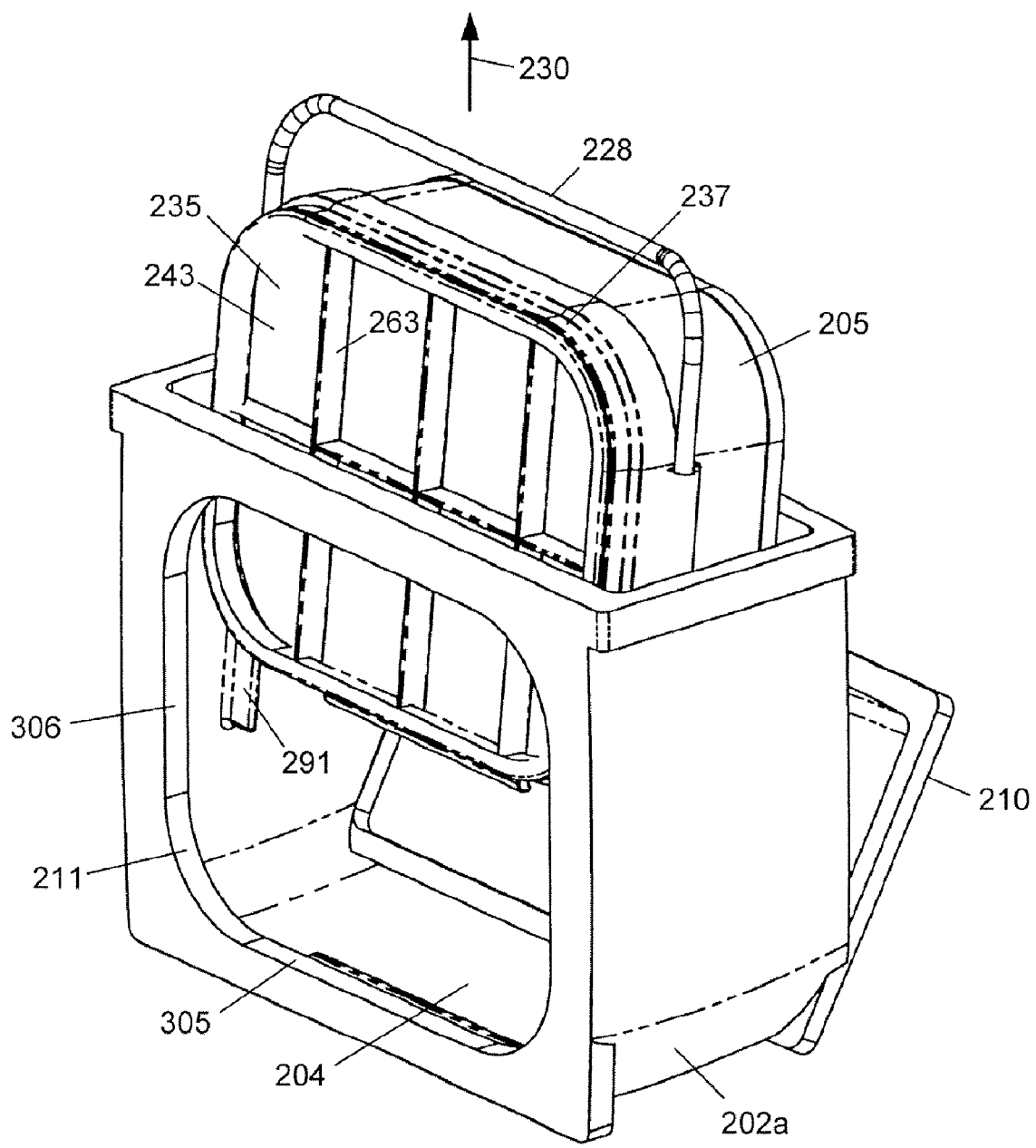
FIG. 9 is a view analogous to FIG. 8, depicted further along a process of removal of a serviceable filter cartridge.

In FIG. 9, housing base 202a is shown with filter cartridge 205 partially removed as a result of pulling on handle 228 in the general direction of arrow 230.

Figure 10:
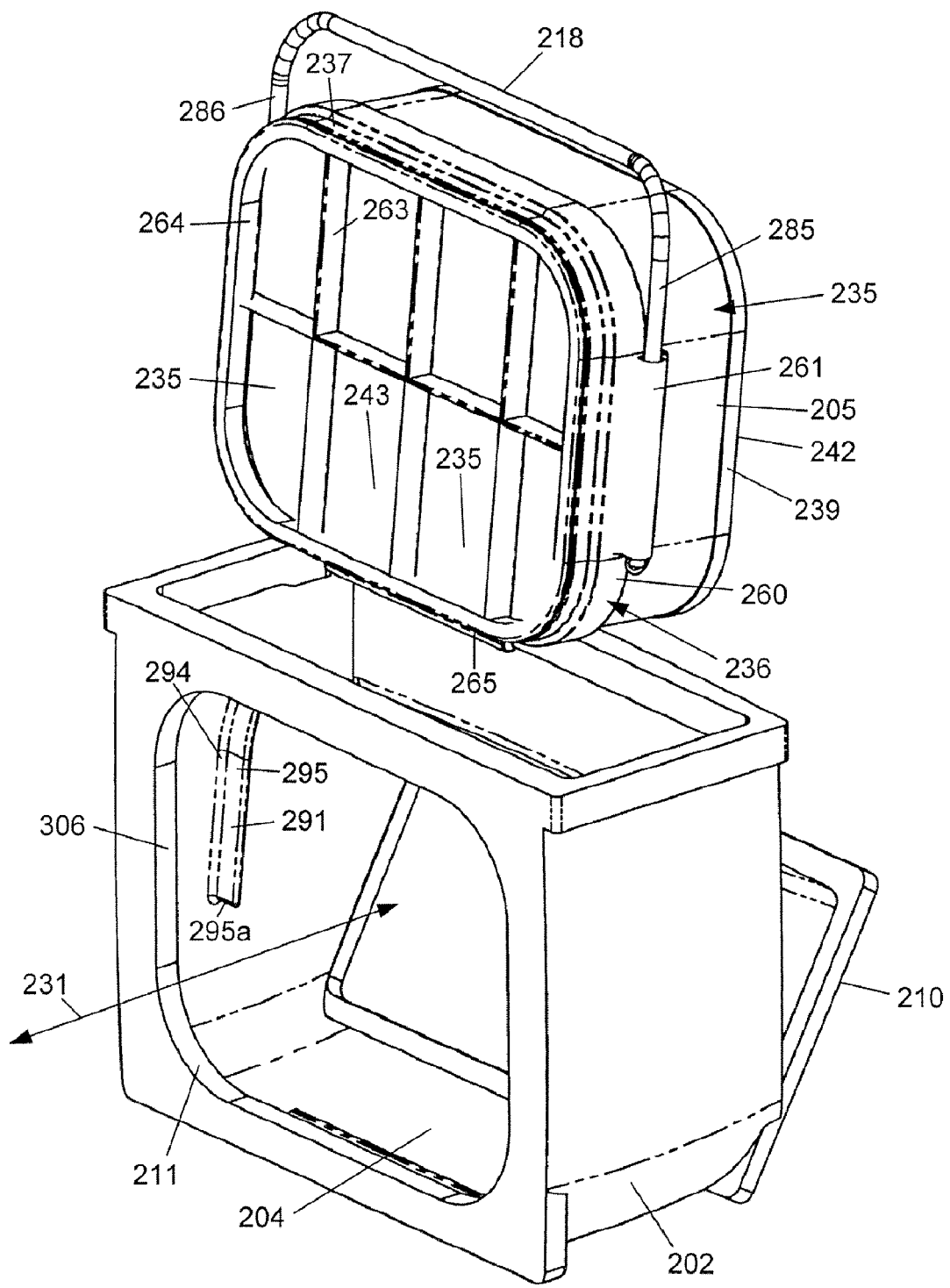
FIG. 10 is a view analogous to FIGS. 8 and 9, after complete removal of the air filter cartridge.

In FIG. 10 assembly 200 is depicted with filter cartridge 205 completely removed from housing base 202a.

Of course it is noted that installation of a filter cartridge 205 in housing 202 would involve a reverse process, i.e., progression from FIG. 10 to FIG. 6.

Detail relating to the preferred features for interaction between the air filter cartridge 205 and the housing 202, are described in detail below. From review of FIGS. 6-10, it will be apparent for the particular arrangement depicted, insertion and removal of the filter cartridge 205 in the housing 202 generally occurs with initial movement of the filter cartridge 205 generally across (generally orthogonal to) the eventual direction of air flow from inlet 210 toward outlet 211. Also, movement (axial rock, tip or tilt) of the filter cartridge 205 into, and out of, the sealed orientation (FIG. 7) relative to the unsealed orientation (FIG. 8) preferably involves axial tilt, tip or rock movement with no rotational movement around an axis 231, FIG. 10, parallel to filter flow through the filter cartridge 205. The term "axial tilt, tip or rock movement," and variants thereof, are used herein is meant to refer to a movement in the direction of arrow 225, and the opposite direction, FIG. 8, for example with handle 228 moving either toward or away from outlet 211. The utilization of the term "axial" in connection with this, is meant to be a reference to a rock, tilt or tip of the filter cartridge 205 generally parallel to a direction of air flow therethrough.

B. The Serviceable Filter Cartridge.

Attention is now directed to the serviceable filter cartridge 205 as viewed in FIG. 10. The preferred filter cartridge 205 depicted includes: filter media pack 235; outlet end framework 236; housing seal arrangement 237; handle arrangement 238, including handle 228; and, inlet end framework 239.

Attention is first directed to the filter media pack 235. Although alternatives are possible, for example a stack of single facer strips, the filter media pack 235 preferably comprises a coiled z-filter media pack with media features generally as characterized above. The particular shape of the media pack 235 shown is with: opposite inlet and outlet flow faces 242, 243; inlet face 242 being viewable in FIG. 11. For the arrangement depicted, flow faces 242, 243 are each generally planar, and extend parallel to one another. Alternatives are possible.

Figure 11:
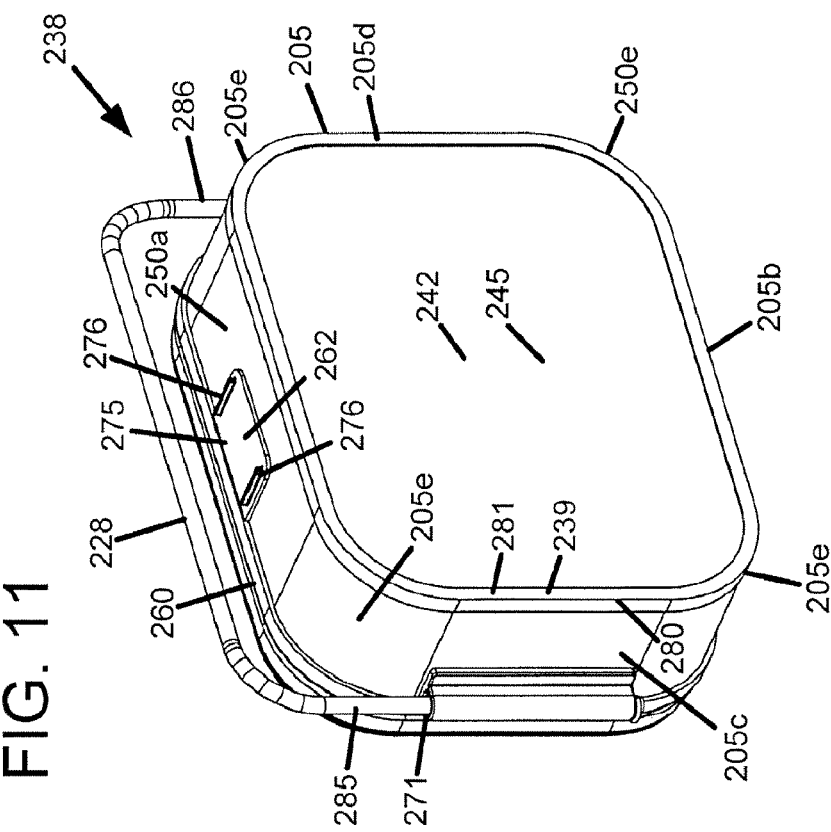
FIG. 11 is a rear perspective view of a filter cartridge configured to be internally received within air cleaner assembly of FIG. 6, depicted with a handle in an upper extended orientation.
Figure 11A:
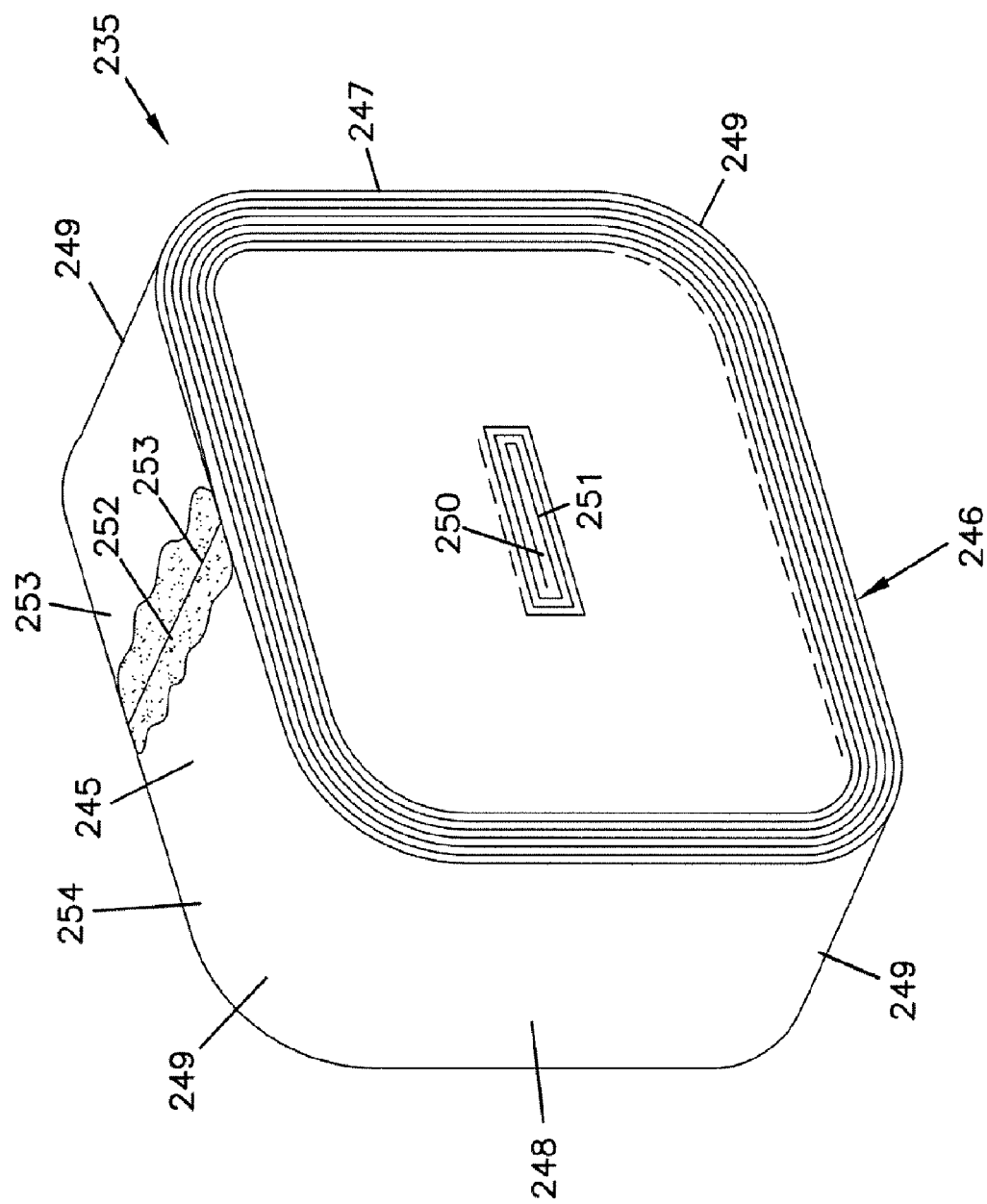
FIG. 11A is a perspective view of a coiled z-filter media construction useable in the filter cartridge of FIG. 11.

The media pack 235 is viewable schematically in FIG. 11A. Referring to FIG. 11A, the media pack 235 includes an outside perimeter formed in a shape having a first pair of opposite (top and bottom) sides 245, 246, FIG. 11; a second pair of opposite sides 247, 248; and, with four curved corners 249 therebetween. When made from a coiled strip of media, such a configuration has sometimes been characterized as "scround," a combination of rectangular (or in some instances square) and wound. The shape is depicted in related to PCT Application US04/03950, filed Feb. 10, 2004; and, in a related Provisional Application 60/545,401, filed Feb. 17, 2004. Both of these applications are incorporated herein by reference.

It is noted that a variety of alternate shapes can be used. The particular "scround" shape depicted, is convenient for providing a large volume of z-filter media within the configuration provided by housing 202.

It is noted that with coiled arrangements, there is generally a center 250 which needs to be closed against passage of air therethrough. If the coil is around a central core or hub, at 251, the media 249 can be sealed thereto with sealant. If the media pack is configured in the coiled shape without use of a center core, then the center core can be a poured and molded-in-place core, for example in accord with the general principles of U.S. Provisional Application entitled "Z-Filter Media Pack Arrangement; and, Methods," filed Jun. 8, 2004, naming Schrage, et al, as inventors, having Express Mail No.: EL 976593997 US, incorporated herein by reference; or with alternate, appropriately positioned, sealant.

At the end of the media pack coil on the outside of the media pack, there is sometimes a desire or need for a tail end seal at 252, FIG. 11A. The tail end seal typically includes two components comprising:

1. A seal between the corrugated strip and facing strip of the single facer strip 253; and,
2. A seal between the end 252 of the single facer trip 253, and the next underneath coil.

Both seals can be provided by covering the tail end with a sealant, as for example shown at seal 254, FIG. 11A. The seal 254 can be formed from a hot melt or molded polyurethane or other seal material, as desired and as the environment of use may dictate.

The techniques described herein can be applied with media packs that include, around an outside of the media (for example the media coil) an impermeable sheath or covering permanently attached to the media pack; or, with arrangements in which the outside surface 254, FIG. 11A, of the media pack 235 simply comprises an outer surface of the media strip 253.

Attention is now directed to the outlet end framework 236, FIG. 10. The outlet end framework 236 generally includes the following components: perimeter band or rim 260, handle support arrangement 261; optional top strike plate arrangement 262 (not included in FIG. 10, see FIG. 11); outlet end media pack support grid 263; pivot projection 265; and, housing seal support extension 264. (It is noted that in FIG. 10 the filter cartridge 205 is depicted schematically relative to FIG. 12, and strike plate 262 is not shown in FIG. 10 but is viewable in FIG. 12.)

In general, perimeter rim 260 is configured to engage and surround an outer wall of the media pack 235 therearound, adjacent outlet face 243. The perimeter rim 260 would typically be secured and sealed to the media pack 235, by an adhesive/sealant, to avoid leakage therebetween and to provide for a secure engagement. The perimeter rim 260 will support and protect the media pack 235 adjacent outlet face 243. Preferably the perimeter rim 260 extends along the media pack 235 from outlet face 243 toward inlet face 242, an amount no greater than 50% of the distance between faces 242, 243, most preferably an amount no greater than 40% of that distance. In this context, the term "perimeter rim" will be understood to be the portion at framework 236 that extends completely around the media pack 235.

Figure 20:
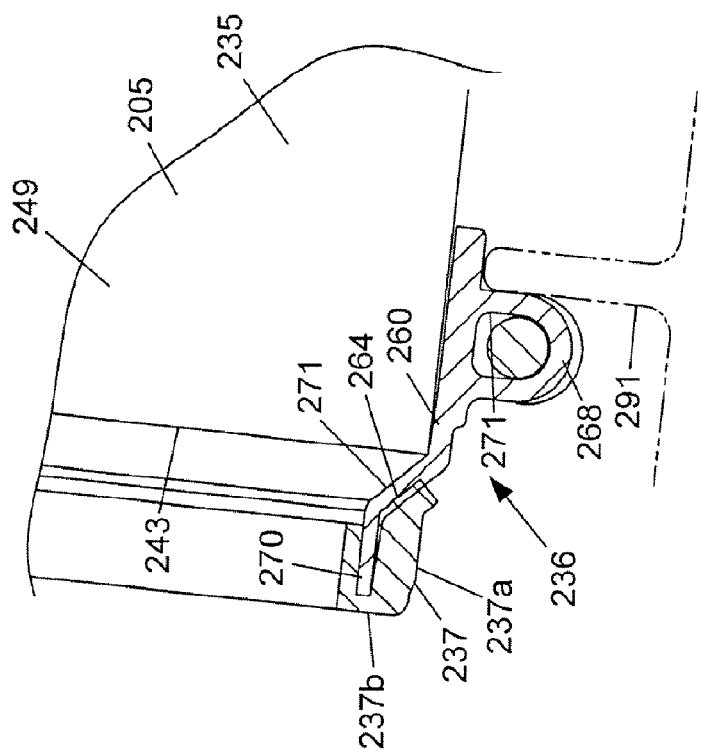
FIG. 20 is a schematic fragmentary cross-sectional view taken generally along line 20-20, FIG. 19.

For the particular outlet end framework 236 depicted, the housing seal support extension 264 is integral with the perimeter rim 260, FIG. 20. The housing seal support extension 264 includes projection 270 therein, projecting axially outwardly from media pack outlet face 243, to support housing seal 237 thereon. It is noted that support extension 264 could be configured to extend in the same plane as perimeter rim 260, if desired. However for the particular arrangement shown, extension 264 is secured to perimeter rim 260 by transition portion 271; and, transition portion 271 positions the housing seal support extension 264 over a portion of media pack outlet face 243. Either type of arrangement will be described herein as a support extension 264 including a projection 270 projecting axially outwardly from media pack 249.

The housing seal 237 may comprise a seal member attached to extension 270, for example with an adhesive. Alternatively the seal 237 could comprise a seal material molded to extension 270. In general, an arrangement molded to the extension 270 will be typical and preferred, the seal material 237 typically comprising molded polyurethane. A variety of molded polyurethanes can be used, for typical arrangements. One of preferred choice comprises foamed polyurethane. Although alternatives are possible, the preferred polyurethane will be typically molded to an as-molded density of not greater than 30 lbs/cu.ft. (0.48 g/cc), typically not less than 10 lbs/cu.ft. (0.16 g/cc). It will typically be chosen to have a hardness, Shore A, of not greater than 30 typically not greater than 22 and usually within the range of 12 to 20. Although alternative, for example harder and more dense, urethanes could be used, in general they are not preferred for weight, performance and cost savings. Further, more dense urethanes can make seals that are rather difficult to insert and remove, if the maximum interference between the seal 237 and the housing framework against which the seal is to be made is sufficiently large.

Referring to FIG. 20, it is noted that the outer surface 237a of the housing seal 237, is stepped for increasing outer perimeter size in steps from outer axial end 237b. This provides for a preferred configuration, for ease of installation and provision of a secured seal.

Referring to FIG. 10, grid work 263 is positioned in extension across outlet face 243 of the media pack 235, to support the media pack 235 against deformation, under air pressure directed toward inlet face 242. The support grid 263 can be integral with the perimeter rim 260 and housing seal support 264, and would typically be secured to transition section 271, FIG. 20, between the two. The particular configuration for the grid 263 is a matter of choice, as long as appropriate support for the media pack 235 is provided. The grid 263 can be selected to have an ornamental and/or source indicating (trade dress) appearance.

Figure 19:
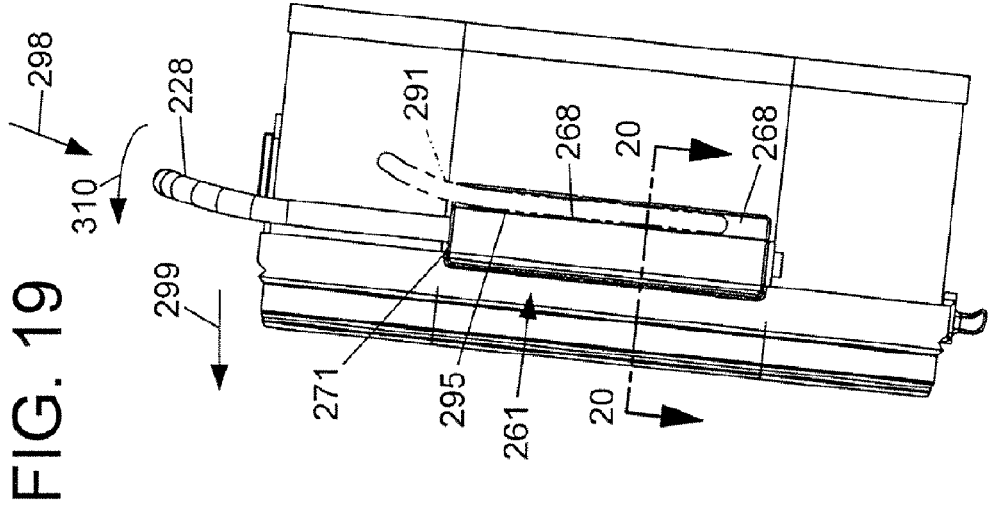
FIG. 19 is a schematic depiction of the filter cartridge of FIG. 11 shown during a step of engagement during insertion with a side portion of the housing component of FIGS. 16-18, shown in phantom.

Comparing FIGS. 19 and 21, it will be understood that the handle support arrangement 261 generally comprises a pair of opposite extensions 268, 269, on opposite sides of the perimeter rim 260, each one of extensions 268, 269, defining a handle receiving conduit (271, 272 respectively) therethrough. In FIG. 20, extension 268 defining conduit 271 is viewed in cross-section. As will be understood from FIG. 20, extensions 268, 269 can be made integral with perimeter rim 260.

Herein above, when it was stated that the perimeter rim 260 preferably did not extend greater than 50%, and preferably not greater than 40%, of a distance from outlet face 243 toward inlet face 242, the reference was not intended to include the extensions 268, 269. However preferably the extensions 268, 269 do not extend all the way to inlet face 242, more preferably not more than 80% of the distance, most preferably not more than 60% of the distance.

Referring to FIG. 11, strike plate arrangement 262 generally extends axially (rearwardly) toward inlet face 242 of media pack, 235, from perimeter rim 260. The strike plate arrangement 262 comprises a pad 275 secured to perimeter rim 260, with upwardly projecting, projections 276 thereon. The operation of top strike plate arrangement 262 will be understood from description provided below.

Herein above, when the preferred distance of axial extension of the perimeter rim 260 from the outlet face 243 toward the inlet face 242 was described, there was no intent to reference the strike plate 262. The strike plate 262 however would preferably not extend toward inlet face 242, from perimeter rim 260, a complete distance between the faces 242, 243, and preferably not more than 80% of that distance.

Still referring to FIG. 11, the cartridge 205 can be characterized as having a first side or top 205a, an opposite second side or bottom 205b and opposite third and fourth sides 205c and 205d, with rounded corners 205e; the terms "top" and "bottom" in this context referring to the orientation of insertion into a housing 202, when positioned as shown in FIG. 6. With respect to this, strike plate 262 can be viewed as being on or adjacent top 205a.

Figure 12:
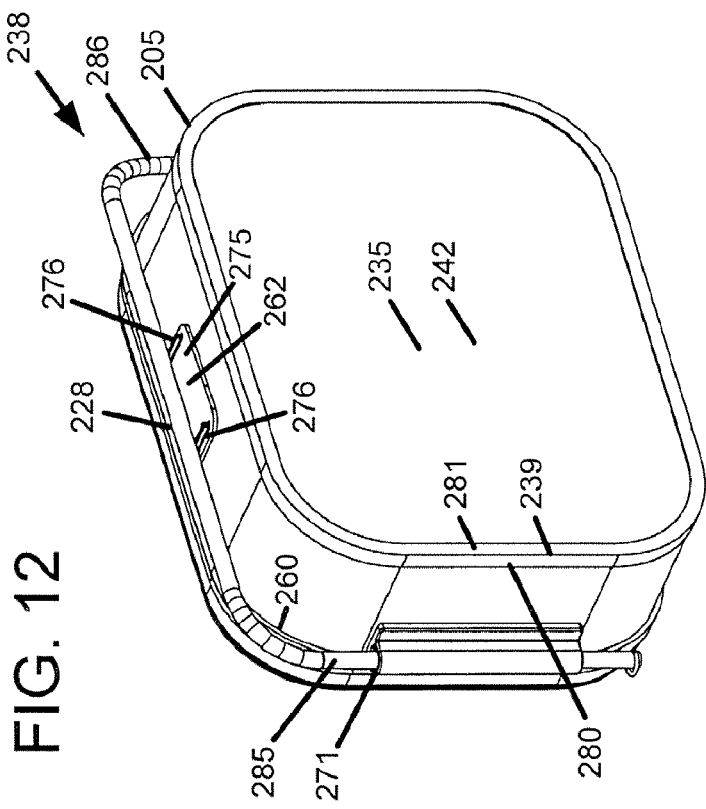
FIG. 12 is a view of a filter cartridge analogous to FIG. 11, with a handle in a lower or retracted configuration.

Referring to FIGS. 11, 12 and 13, the inlet end framework 239 comprises a band or rim structure 280 circumscribing the media pack 235 adjacent the inlet face 242. The particular inlet end framework 239 depicted includes lip 281, FIGS. 11 and 12, extending a small amount over the inlet face 242. The inlet end framework 239 can be secured to the media pack 235 by an adhesive or sealant. The inlet end band or rim 280 will support and protect the media pack 205, adjacent inlet face 242. Preferably rim 280 does not extend completely across media pack 235 from end 242 to end 243. More preferably it extends no more than 50% of that distance, most preferably no more than 40% of that distance.

Referring to FIGS. 11-13, handle arrangement 238 comprises handle 228 with side legs or extensions 285, 286. The preferred handle 228 is positioned to extend across top side 205a of media pack 205 in a direction generally parallel to inlet and outlet surfaces 242, 243. The side extensions 285, 286 are configured to extend through handle conduits 271, 272 respectively. Referring to FIG. 21, each side extension 285, 286 includes an end projection 288, 289 respectively thereon, to prevent the handle arrangement 238 from being removed from projection through the extensions 268, 269, after assembly. Although alternatives are possible, preferably extensions 285, 286 and conduits 271, 272 are sized and configured so that the handle 228 is slidably mounted, i.e., so it can slide between a lower, bottom or retracted position as indicated in FIG. 12, and an upper, raised or extended position as indicated in FIG. 11. Typically projections 276 and pad 275 are sized so that when the handle 228 is in the lower position, FIG. 12, its rests against strike plate arrangement 262.

Attention is directed to FIG. 13 in particular to axial pivot arrangement or projection 265.

The preferred axial pivot arrangement 265 comprises a base pivot 265a that extends at least partially across second bottom side 205b of filter cartridge 205, in a direction opposite top side 205a and in extension between, but typically spaced from, sides 205c, 205d, as shown in FIG. 21. As shown in FIG. 13, axial base pivot arrangement 265 is secured to, and projects outwardly from, perimeter rim 260. It preferably includes an axial projection 290 extending toward filter cartridge inlet end 242. Pivot arrangement 265 can be secured to perimeter rim 260, or can be configured integrally therewith.

Preferably axial base pivot 265 extends across bottom section 205b of filter cartridge 205 a distance corresponding to at least 20% of a distance between opposite sides 205c, 205d, and typically at least 30% of that distance, most preferably at least 40% of that distance. In instances in which base pivot 265 is segmented, not shown, preferably the entire length, between and including end segments, corresponds to such preferred lengths.

C. Installation of the Filter Cartridge in the Housing.

Figure 16:
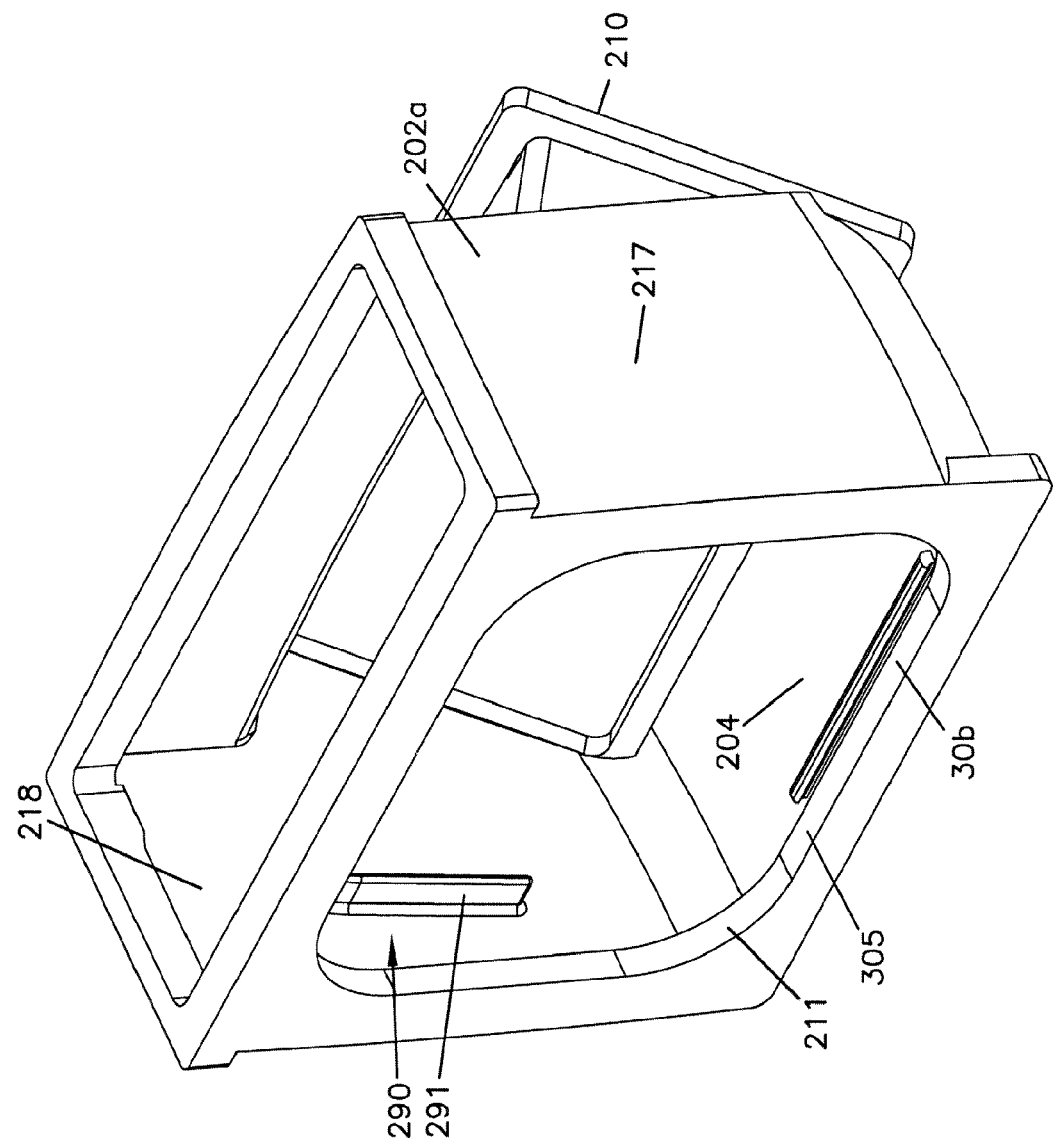
FIG. 16 is a schematic outlet end perspective view of an air cleaner housing for the air cleaner assembly of FIG. 6, depicted with an access cover removed and without an internally received filter cartridge.
Figure 17:
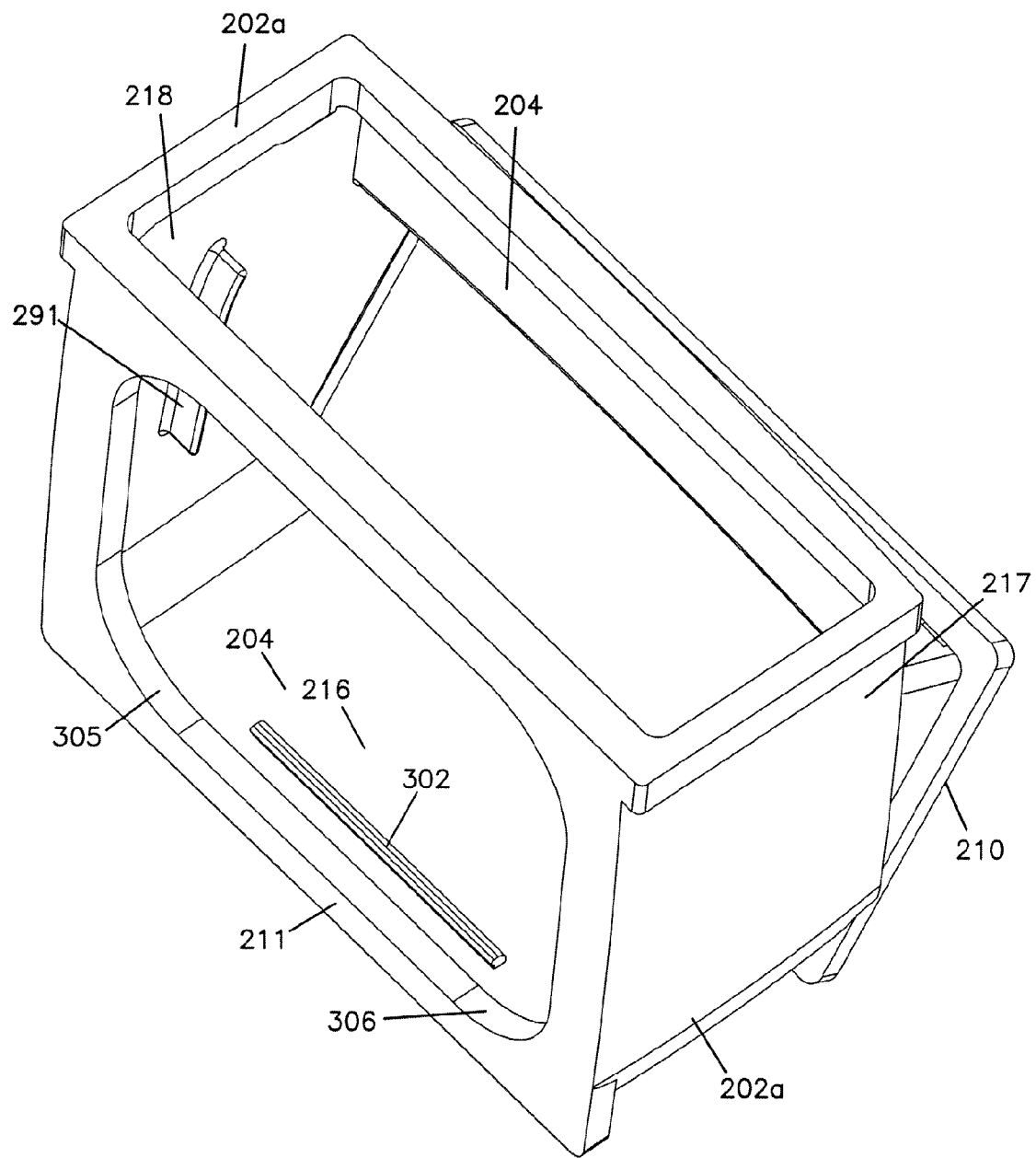
FIG. 17 is a schematic view of the housing component of FIG. 16, from a different orientation.
Figure 18:
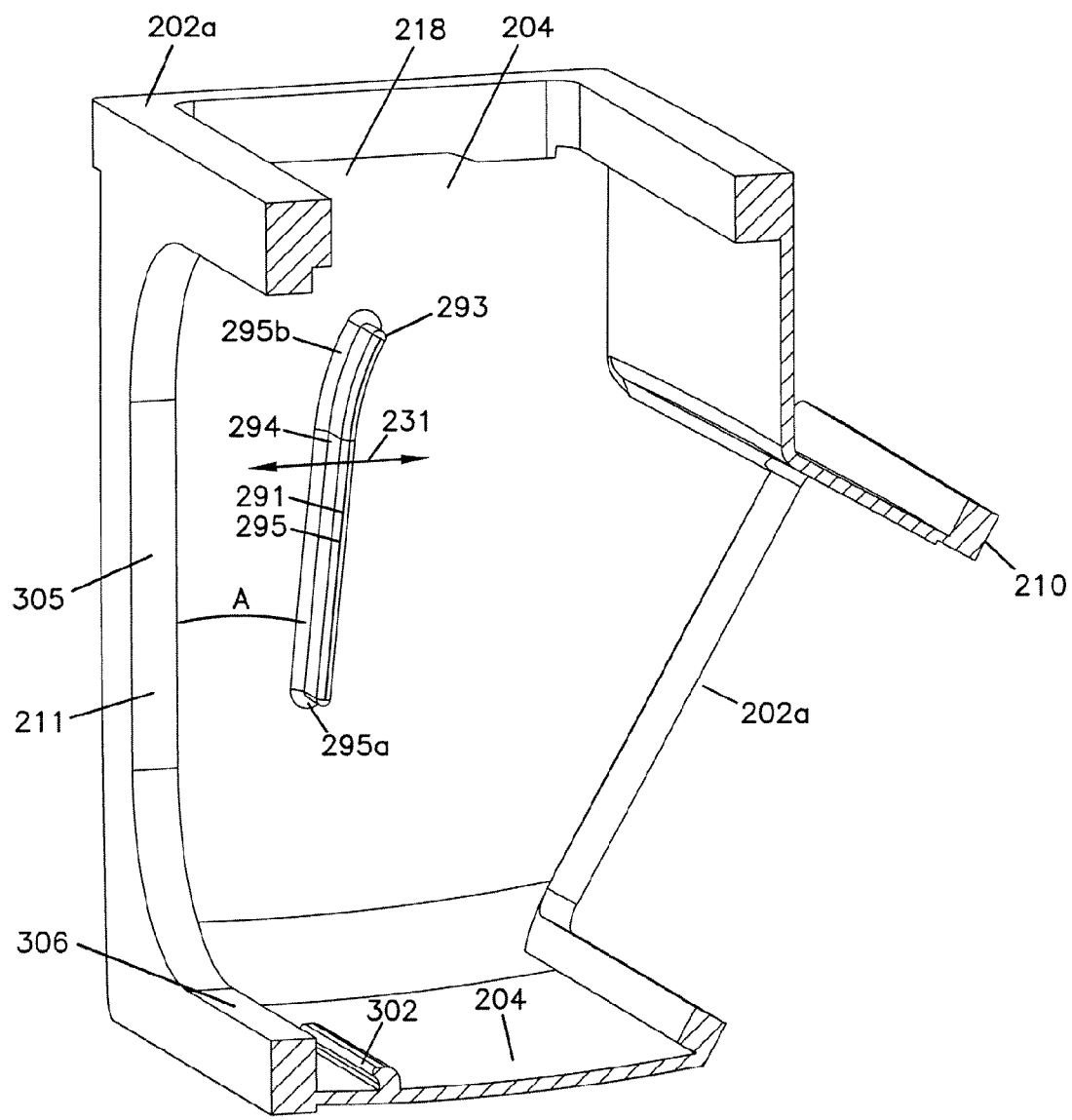
FIG. 18 is a schematic cross-sectional view of the housing component depicted in FIG. 16.

Attention is now directed to FIGS. 16-18, in which housing base 202a is depicted schematically. (It is noted that detail such as bolt holes is not provided.) FIG. 18 is a cross-sectional view. Referring to FIG. 16, housing 202 includes cam or biasing (guide) arrangement 290 therein. Although alternatives are possible, the cam or biasing (guide) arrangement depicted comprises a biasing ramp or guide arrangement 291 positioned on side wall 218. It is noted that, for the arrangement shown, an analogous biasing ramp or guide arrangement would be mounted as a mirror image, on an interior of side wall 217.

Each ramp or guide 291 includes a flared upper end 293, FIG. 18, flared in extension away from outlet end 211. Further the ramp or guide 291 includes a mounting base 294 and a slanted guide 295. Although alternatives are possible, the guide 295 typically extends at an angle A, FIG. 18, of 3° to 10°, for example 3° to 8° with respect to an axial direction 231; with bottom end 295a closer to housing outlet 211 and upper end 295b further from housing outlet 211.

The ramp or guide arrangement 291 is positioned to be engaged by the filter cartridge 204, (although alternatives are possible) by extensions 268, 269 on filter cartridge 204, during assembly. Referring to FIG. 20, it can be seen that ramp or guide 291 (in this case the mirror image ramp to ramp or guide 291, FIG. 18) is positioned to engage a portion of extension 268 defining conduit 271. In FIG. 19, this engagement is shown in side elevation. Referring to FIG. 19, as the filter cartridge 205 is pushed in the general direction of arrow 298, it will bias in the direction of arrow 299, due to the slanted guide 295 engaging extension 268. An analogous engagement will occur at the opposite side of the filter cartridge 205. This engagement and biasing action, is a part of the operation between the filter cartridge 205 and the housing 202, to seal the filter cartridge 205 in position, by hand, during assembly and/or service. It is noted that when the cartridge 205 is slid into the housing base 202a, in engagement with the biasing or guide arrangement 290, outlet face 243 is directed upwardly and toward outlet end 211; and, inlet face 242 is directed downwardly and toward inlet end 210.

Attention is now directed to FIG. 17. From FIG. 17, it will be understood that bottom 216 of housing base 202a includes axial pivot projection 302 thereon. The projection 302 is a base axial pivot projection positioned to be engaged, as described below, by base axial pivot 265 of filter cartridge 205, during assembly. Projection 302 preferably includes a portion directed toward outlet 211. Although alternatives are possible, typically axial projection 302 extends an amount, between sides 217, 218, corresponding to at least 20% of the distance between those sides (217, 218), typically an amount corresponding to at least 30% of that distance, and in some instances an amount corresponding to at least 40% of that distance. Preferably, if the base projection is segmented, not shown, the complete length, between and including the outer most segments has a similar length. This bottom extension, in coordination with the preferred amounts of extension for the pivot 265a discussed above, provides for a relatively stable pivot arrangement, for the cartridge 205.

After insertion according to FIG. 19 is conducted, the air cleaner arrangement will have the general configuration shown, in fragmentary view in FIG. 14 (or in FIG. 8). In particular, filter cartridge 205 will be positioned with housing seal arrangement 237 partly positioned within receiver 305. Referring to FIGS. 16-18, the receiver 305 is defined by circumferential perimeter flange 306. That is, when installed, housing seal arrangement 237 is pushed into the perimeter defined by flange 306, to form a radial seal therewith; the flange 306 being positioned around an outside of seal surface 237a, FIG. 20.

In addition, referring to FIG. 14, after insertion of cartridge 205 with engagement of ramp or guide 291, FIG. 20, base pivot 265 will be positioned axially adjacent housing projection 302, and generally between housing projection 302 and outlet end 211 of housing base 202a.

Once the insertion position of FIG. 14 is accomplished, when the filter cartridge 205, for example by grasping handle 228, is axially pivoted in the direction shown by arrow 310, FIG. 19, base pivot 265 on cartridge 205, FIG. 14, will bias or pivot against projection 302. This will cause the seal arrangement 237 to be pushed (axially) into flange 306, in the direction of arrow 310a, to securely position the cartridge 205 with perimeter seal 237 secured within flange 306 as a radial seal, as shown in FIGS. 15 and 16. The particular radial seal described will sometimes be referred to herein as a "outside" radial seal, since the housing seal surface to which the seal arrangement 237 is secured, is positioned around housing seal arrangement 237. (In schematic FIG. 15, the seal 237 is not shown compressed or distorted, as it would be in typical use.) It is noted that alternate seal arrangements, for example internal radial seals in which the seal member surrounds the housing seal flange, are possible.

The particular pivot arrangement shown, is operated with no rotation of the seal arrangement 237 about an axial media pack axis extending through the media pack between faces 242, 243. Such an axial rock, tip or tilt motion will sometimes be referred to as an exclusively axial rock, tilt or tip motion, or by variants thereof.

Referring to FIG. 14, to facilitate engagement for pivoting, pivot projection 265 includes axial projection 290 thereon; and housing internal projection 302 includes axial projection 302a thereon. The term "axial," in this context, is meant to refer to a direction in line with a flow direction through the media pack 235 in use, generally indicated by arrow 311, FIG. 15. For the particular arrangement shown, axial projection 290 is directed in an upstream direction, and projection 302a is directed in a downstream direction.

FIG. 15 is analogous to FIG. 14, except it depicts the arrangement with filter cartridge 205 fully secured in a sealed position relative to housing base 202a.

After axial rocking into the position of FIG. 15, generally the filter cartridge handle 228 is lowered to the position shown in FIG. 13. When the handle arrangement 238 is lowered, it will abut strike plate arrangement 262. This is also shown in FIG. 12.

After this step of installation, the access cover 203 can be positioned as shown in FIG. 6.

Figure 24:
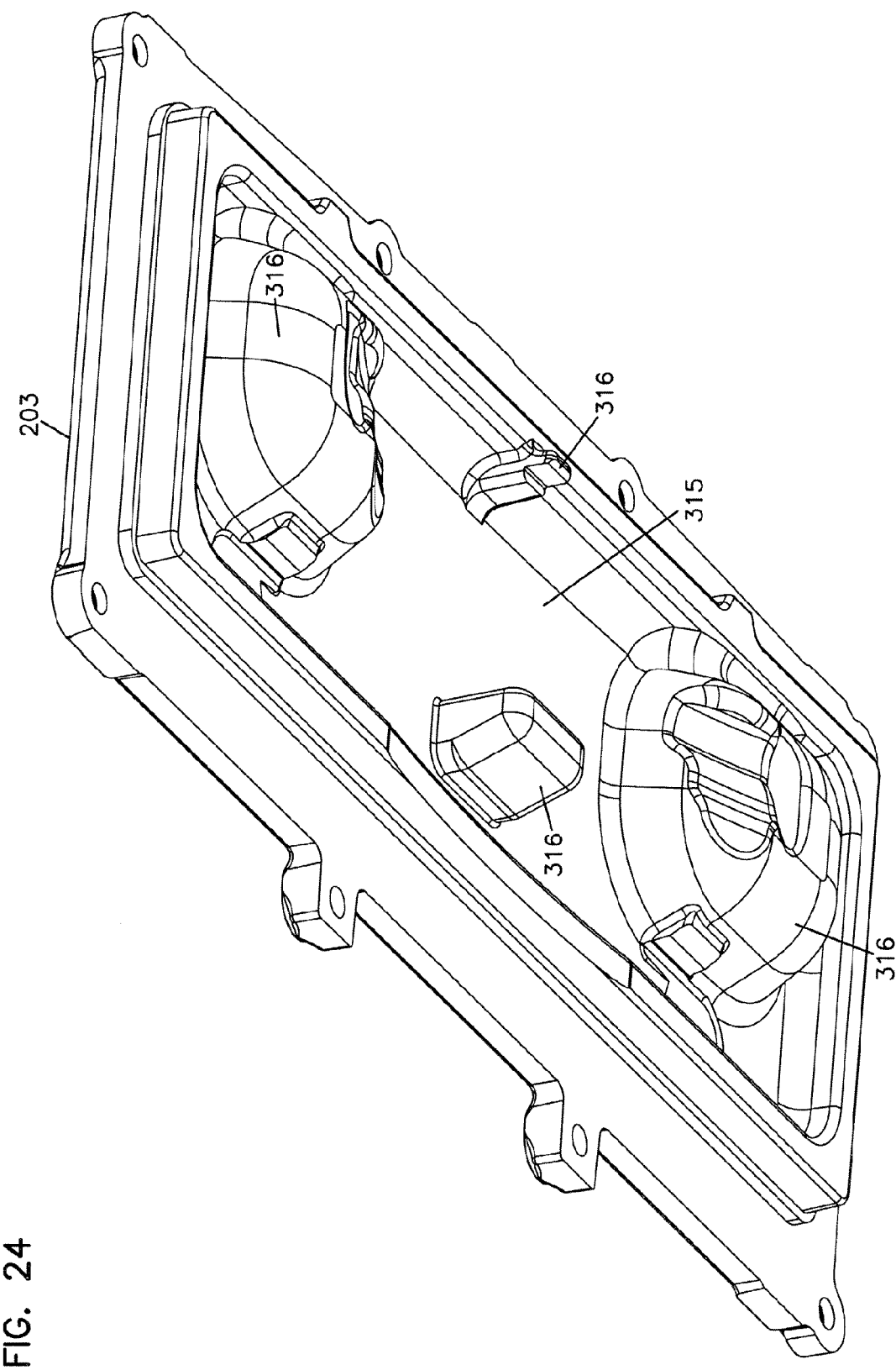
FIG. 24 is a perspective view of an inside surface of a service or access cover for the air cleaner assembly of FIG. 6.

Preferably the access cover 203 includes an inner surface 315, FIG. 24, with a projection arrangement 316 thereon that extends, when cover 203 is in place, into interior 204 of housing 202. The projection arrangements can be sized and positioned to help secure the cartridge 205 in position. This will be understood by reference to FIGS. 25 and 26.

Figure 25:
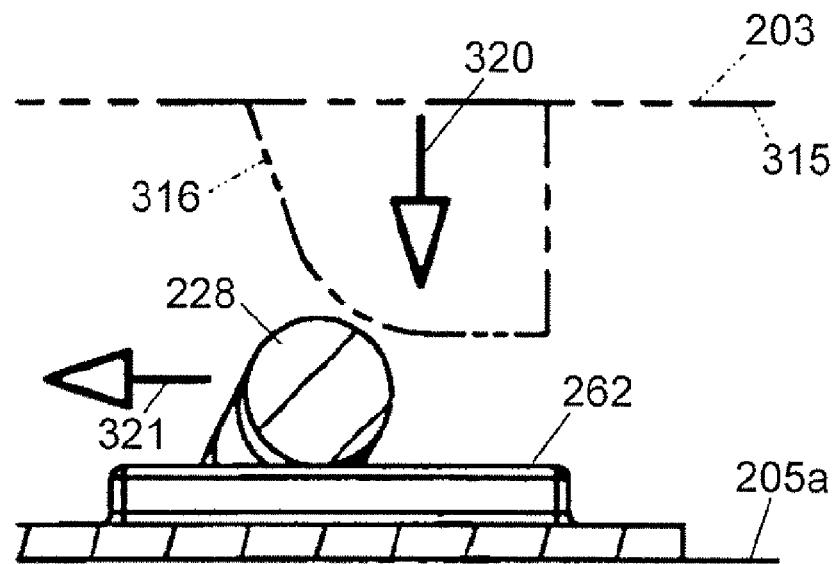
FIG. 25 is a fragmentary cross-sectional view of a portion of an air cleaner filter cartridge depicted during a step of positioning of a service cover in the air cleaner assembly of FIG. 6.
Figure 26:
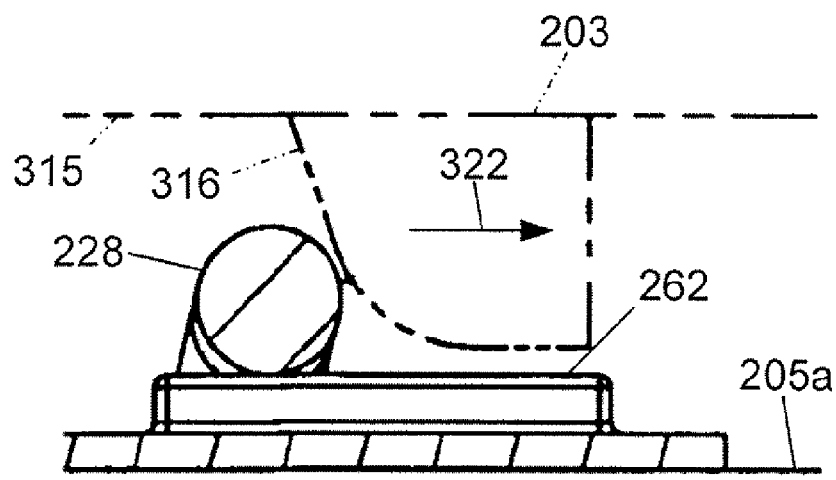
FIG. 26 is a view analogous to FIG. 25, depicted after cover placement on the housing.

Referring to FIG. 25, cover 203 and projection arrangement 316 are shown schematically, during a step of installation at cover 203. As the cover 203 is lowered in the direction of arrow 320, a portion of filter cartridge 205, in this instance, handle 228, will be biased by surface 316 in the general direction of arrow 321. The handle arrangement 238 can be constructed with sufficient spring or flex, to allow for this motion. In FIG. 26, a final lowering of cover 203 is shown, with handle 228 biased and secured against movement in the general direction of arrow 322, by projection 316. In this manner the cartridge 205 is prevented against backing out of a secured seal position by: projection 316 and cover 203 on the upper or top side 205a; and, projection 302 against base pivot 265, FIG. 15, at a lower or bottom end 205b.

D. An Example System, FIG. 27.

Figure 27:
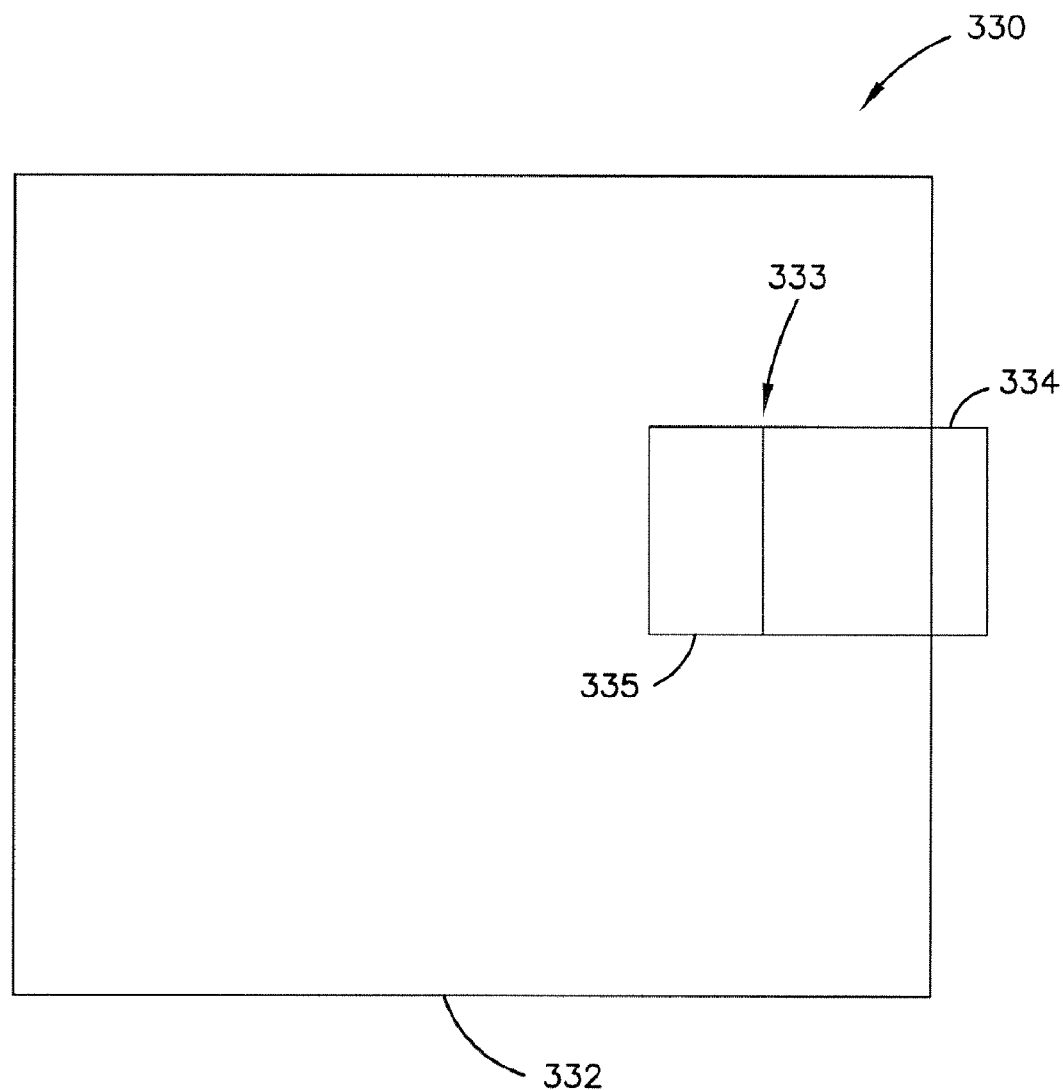
FIG. 27 is a schematic depiction of a system including an air cleaner assembly according to the present disclosure.

The reference numeral 330, FIG. 27, generally indicates an engine system. The engine system 330 includes an internal combustion engine 332, such as a diesel engine, with an air intake system 333 including, among other things, turbocharger and after cooler arrangement 334, and an air cleaner or air cleaner assembly 335. For the particular engine shown, the turbocharger and after cooler arrangement 334 is positioned upstream of the air cleaner 335. Thus, after passage through the turbocharger and after cooler 334, air is forced through the air cleaner 335 and into the air intake for the diesel engine 332. Large diesel engines rated at up to 750 horse power used with military vehicles, would be some typical examples of such an arrangement. The air cleaner described in the previous drawings, for example at 200, FIG. 6, can be used with such equipment, and can be operated with an internal pressure, upstream of the filter media, of, for example, at least 45 psi. However, the techniques described herein can be applied in other systems also, including, for example, ones that do not have a turbocharger upstream from the air cleaner.

E. Example Dimensions and Materials.

Filter cartridges according to the present disclosure can be made with a variety of sizes and dimensions. An example is one having: a height, i.e., distance between sides 245, 246, FIG. 11A, of at least 8 inches (20 cm), and typically within the range of 8-12 inches (20-30.5 cm), for example about 10 inches (25 cm); a width, i.e., distance between sides 247, 248, FIG. 11A, of at least 9 inches (22.9 cm), typically within the range of 9-13 inches (22.9-33 cm), for example about 11 inches (28 cm); and, a depth, i.e., distance between the inlet and outlet surfaces, of at least 4 inches (10 cm), typically 4-8 inches (10-19.2 cm), for example about 5 inches (12.7 cm).

Although alternatives are possible, arrangements of such sizes can be readily configured utilizing z-filter media as characterized in sections I and II above.

A variety of materials can be utilized to form the various framework attached to the media pack arrangement. For example the perimeter rim 260, handle support arrangement 261, outlet end media pack support grid 263, pivot projection 265 and seal support extension 264 can be formed, integrally, as a single piece, for example as a cast aluminum piece. (In some systems, it could be made as a plastic piece.)

The top strike plate arrangement 262 could also be integrally formed with the above components, or it could be a separate piece, for example from a different material, and be attached.

Of course the previously identified framework could be constructed from other materials as well, in different systems.

The inlet end framework 239 can also be formed from a cast aluminum ring. It could alternately be constructed from other materials, for example as a molded plastic piece.

Although alternatives are possible depending upon the system, the housing can, for example, be formed as cast metal pieces.

IV. A Second Example Air Cleaner Assembly

Attention is now directed to FIGS. 28-35, in which operation of a modified version of the assembly depicted in FIGS. 6-26 as depicted.

Figure 28:
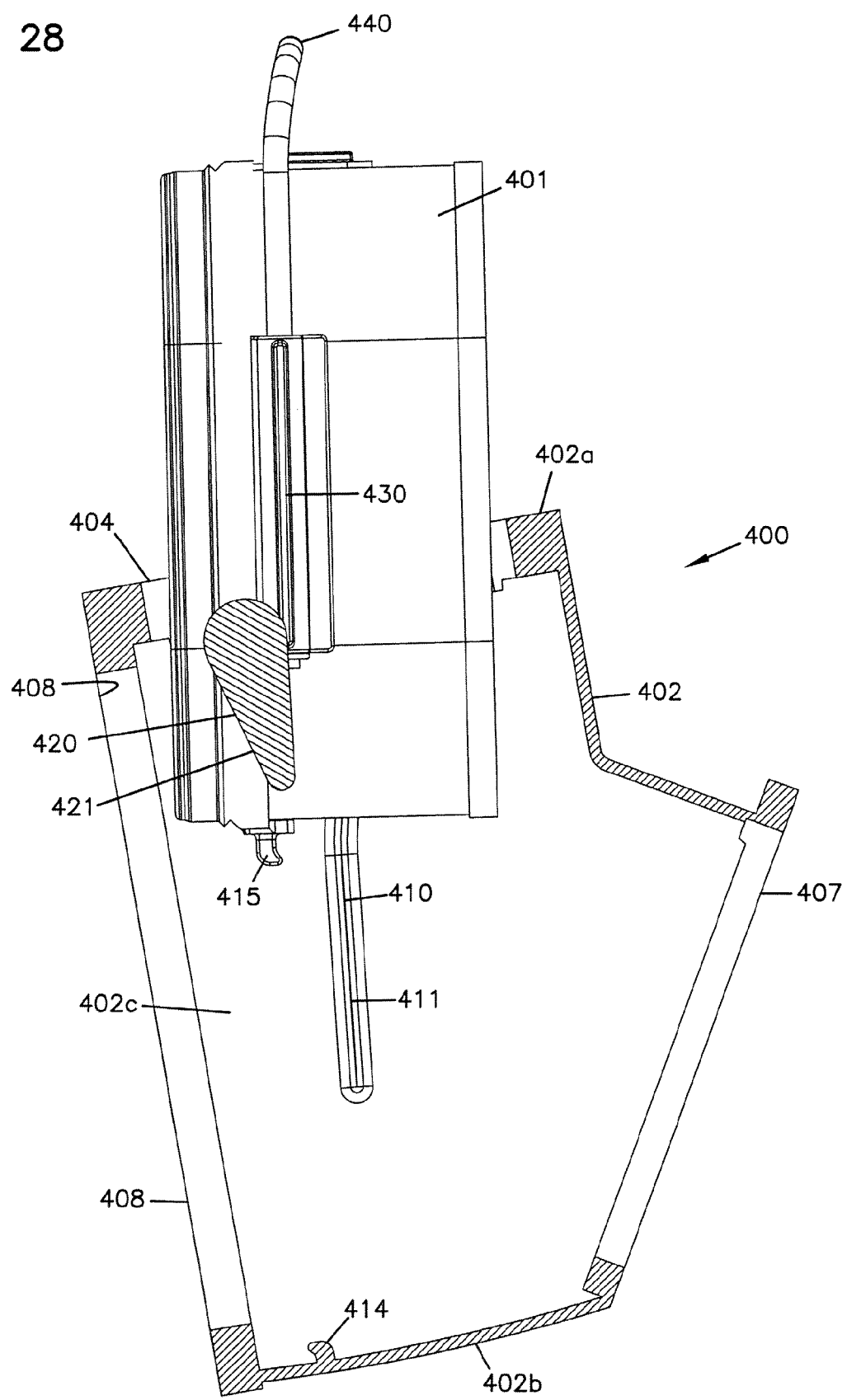
FIG. 28 is a fragmentary schematic view of a step of inserting a filter cartridge into a housing according to a second embodiment of the present disclosure.

Referring to FIG. 28, air cleaner 400 includes filter cartridge 401 and housing 402. The filter cartridge 401 may be generally analogous to the filter cartridge described with respect to FIGS. 6-26. The housing 402 may generally be analogous as well, except for detail as described. In FIG. 28, the air cleaner 400 is shown with the access cover removed and with filter cartridge 401 partially inserted through open top 404. The air cleaner housing 402 includes top 402a, bottom 402b and opposite sidewalls 402c; only one sidewall being viewable in FIG. 28, the opposite sidewall being a mirror image.

Still referring to FIG. 28, housing 402 includes inlet 407 and outlet 408. Analogously to the arrangement of FIG. 16, housing 402 includes a guide or ramp arrangement 410, comprising a biasing ramp or guide 411 mounted on opposite sidewalls at a location behind, rearward or upstream of an engaged portion of a filter cartridge 401 in use. Ramp or guide arrangement 410 may be generally analogous to ramp or guide 291 described above.

The housing 402 further includes an internal upwardly directed projection arrangement 414, for engagement with downwardly projecting arrangement 415 on the cartridge 401, to facilitate pivoting of the cartridge 401 into sealed position. This arrangement can be analogous to arrangement 302, FIG. 17.

Referring to FIG. 28, the air cleaner 400 includes a forward cam or guide arrangement 420. The forward cam or guide arrangement 420 comprises cams or guides 421 positioned on the housing 402 at opposite sides of the air filter cartridge 401, only one cam or guide 421 being viewable in FIG. 28. Forward cam or guide arrangement 420 is positioned near an upper end 402a of the air cleaner housing 402, such that when cartridge 401 is completely inserted, extension 430, and an analogous extension on the opposite side of air cleaner 401, will be able to rock forward by passage of a portion underneath forward cams or guides 421. This will be understood from further description below.

Cam or guide 421 is positioned to engage extension 430, as the cartridge 401 is inserted through open end 404, as will be apparent from further descriptions.

As a result of forward cam arrangement 420, as the cartridge 401 is inserted into the housing 402, extension 430, and an analogous extension on the opposite side of cartridge 401, will slide between the forward cam or guide arrangement 420 and the biasing ramp or rear guide arrangement 411. Together, arrangements 420 and 411 are sometimes referenced as a guide arrangement.

Figure 29:
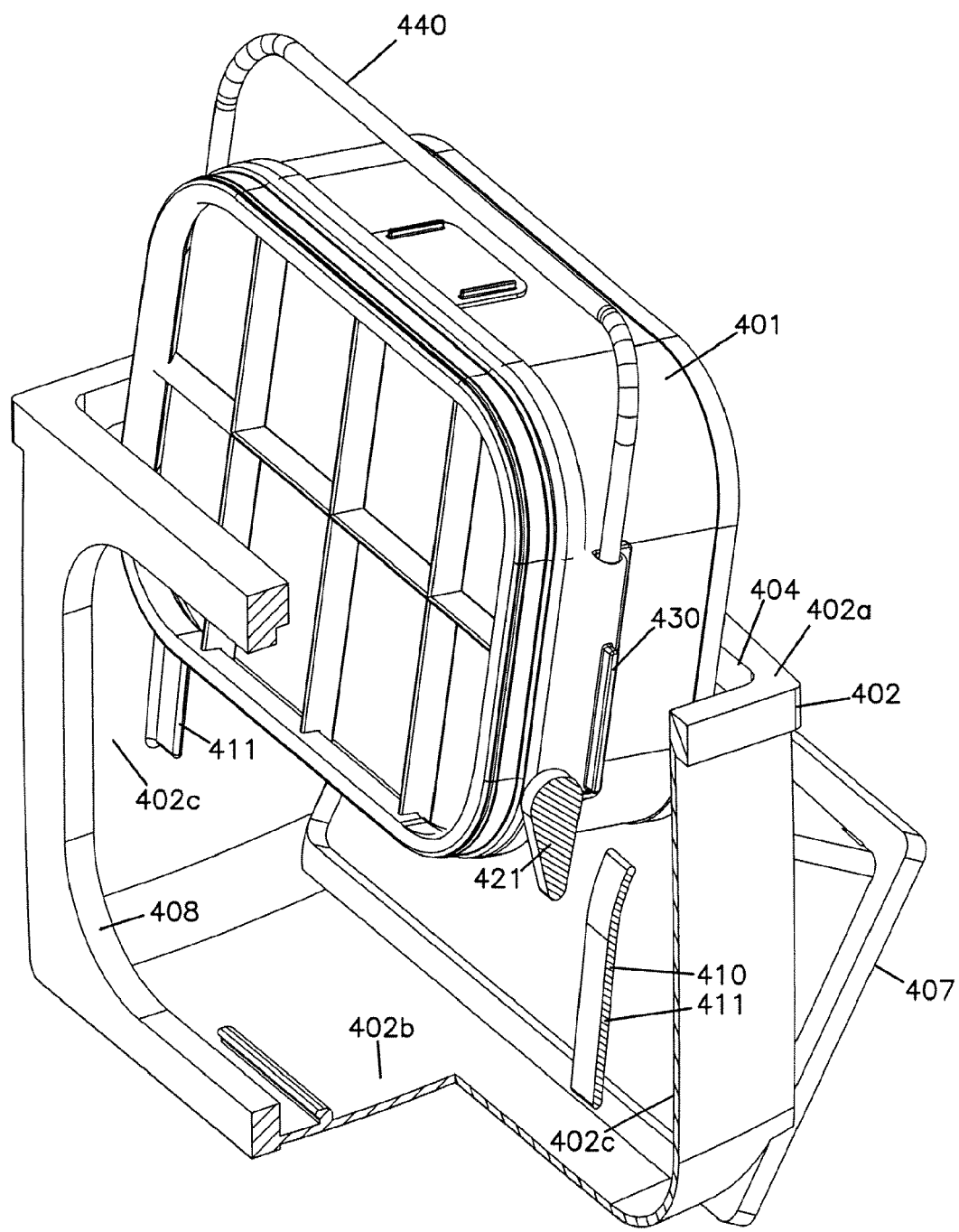
FIG. 29 is a perspective view of FIG. 28.
Figure 30:
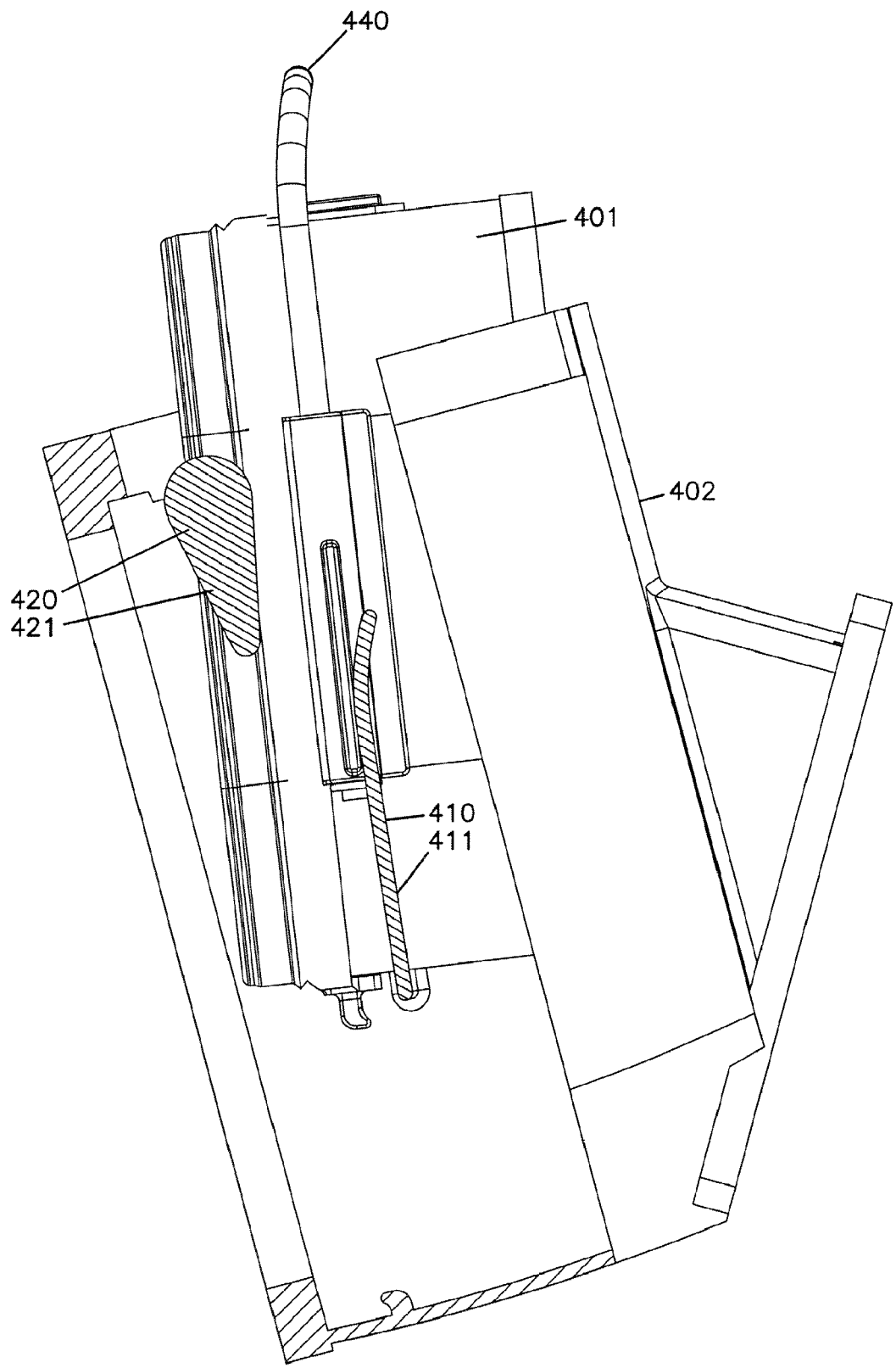
FIG. 30 is a view analogous to FIG. 28, during a step of further insertion.
Figure 31:
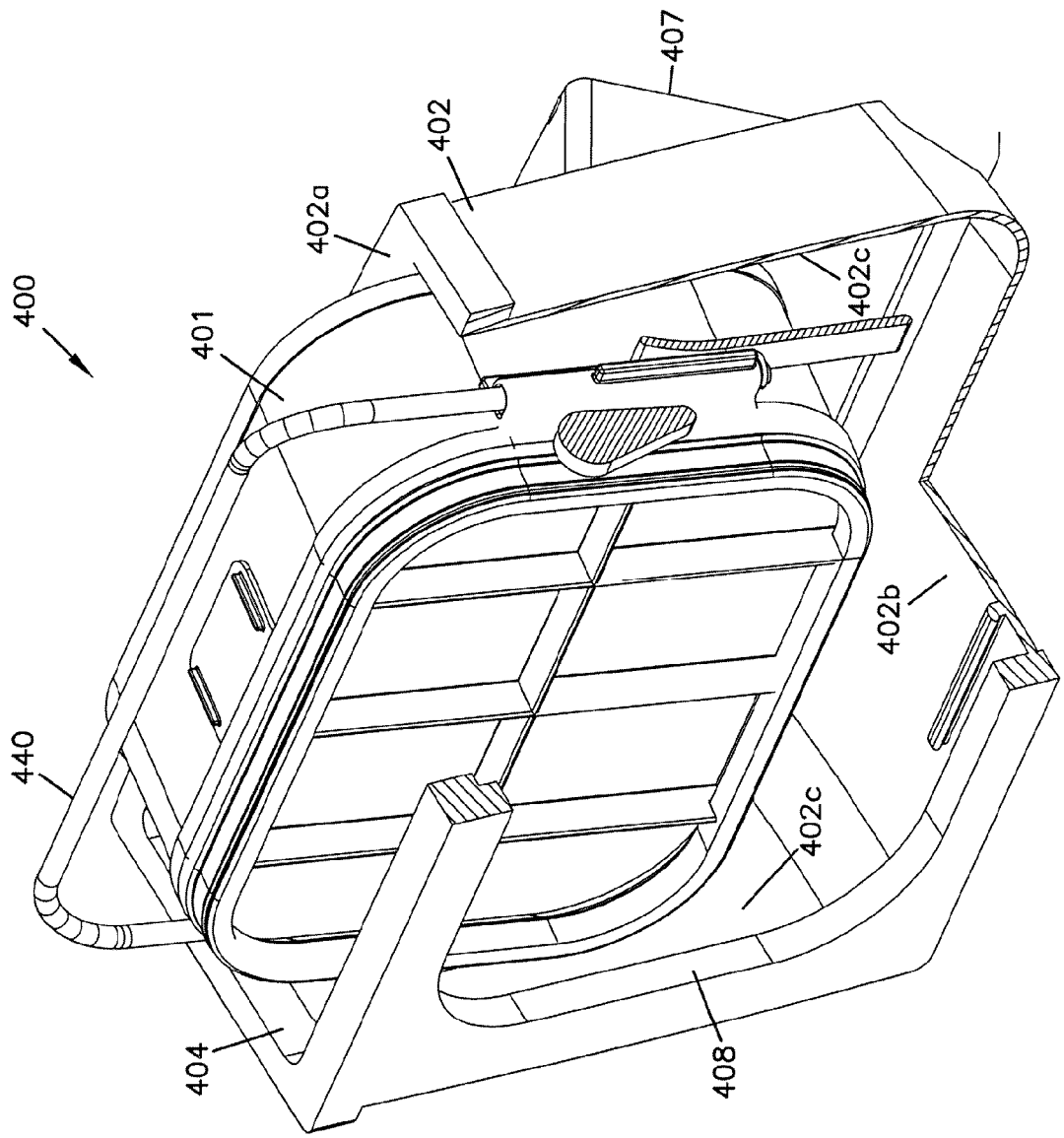
FIG. 31 is a perspective view of FIG. 30.

In FIG. 28, the air cleaner 400 is shown at an initial stage of insertion. In FIG. 29 air cleaner 400 is shown in a similar state, but from a perspective view. In FIG. 30, the cartridge 401 is shown further inserted, with the extension 430 now positioned between forward cam or guide 421 and biasing ramp or guide 411. An analogous engagement would be occurring on an opposite side of cartridge 401. In FIG. 31 the air cleaner 400 is shown in an analogous state as in FIG. 30, except from a perspective view.

Figure 32:
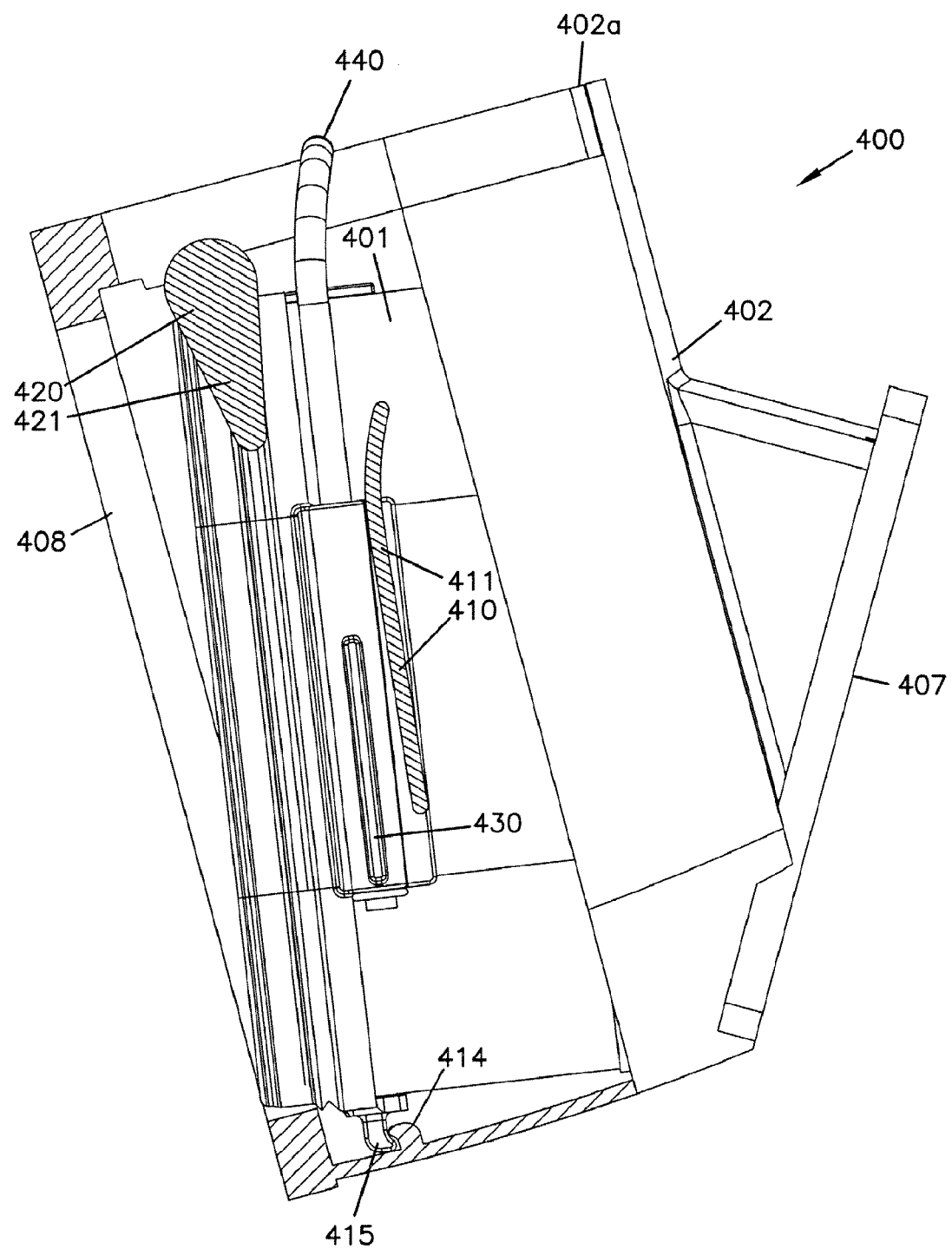
FIG. 32 is analogous to FIGS. 28 and 30, depicting still further insertion.

In FIG. 32, air cleaner 400 is shown with a cartridge 401 fully inserted in the housing 402, but not yet rocked into sealing condition. It can be seen that the forward cam or guide 421 is now positioned above side extension 430. Thus, the cartridge 401 can rock forwardly. It is noted that the housing bottom projection 414 is now engaged by projection 415 on the cartridge 401.

Figure 33:
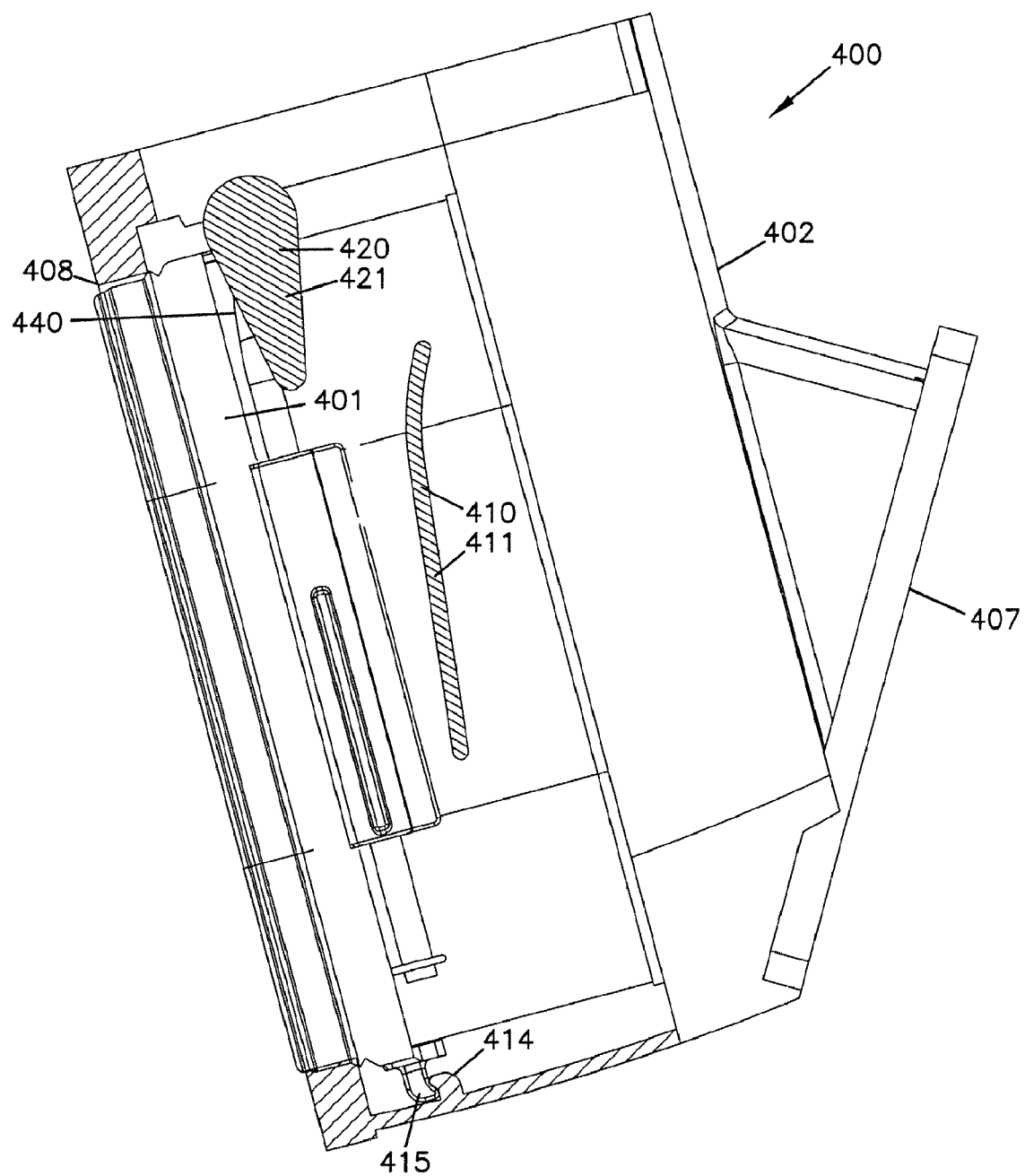
FIG. 33 is a depiction analogous to FIG. 32, after a step of rocking the cartridge forward and lowering a handle arrangement.

Referring to FIG. 33, the air cleaner 400 is shown with the cartridge 401 rocked into sealing engagement with the housing 402, and with the handle 440 lowered.

In general, analogous features in the embodiment of FIGS. 28-33, to those shown and described with respect to the embodiments of FIGS. 6-26, operate analogously and can be characterized analogously. The principal difference with respect to the new embodiment, relates to the utilization of the forward cam or guide arrangement 420, as part of the guide arrangement to facilitate positioning of the cartridge 401 in the housing 420.

Figure 34:
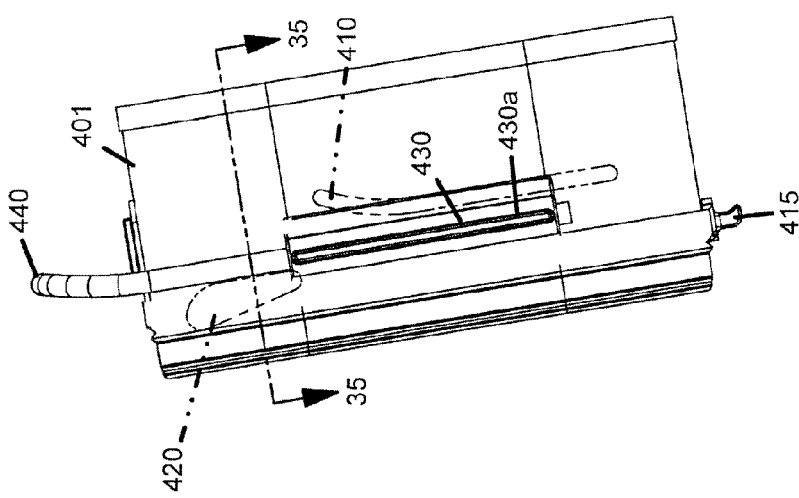
FIG. 34 is a schematic depiction of a filter cartridge according to FIGS. 28-33, engaging a forward cam or guide arrangement and a biasing or guide arrangement during a step of insertion.

In FIG. 34, schematic depiction of cartridge 401 is shown, engaging forward cam or guide arrangement 420 and rear cam or guide arrangement 410. In FIG. 34, the cartridge 401 is depicted just as the forward cam or guide arrangement 420 begins to clear the extension 430 on the filter cartridge 401.

Figure 35:
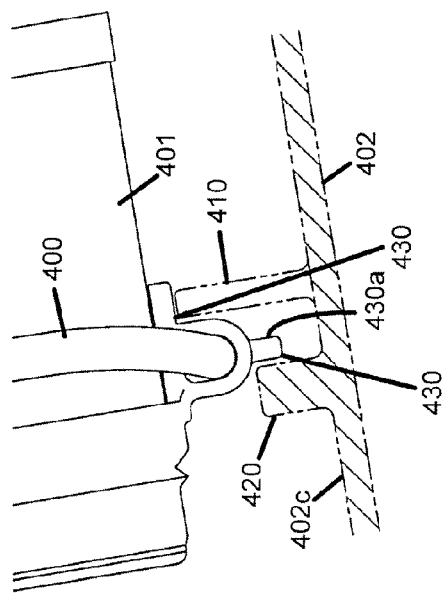
FIG. 35 is a fragmentary cross-sectional view taken along line 35-35, FIG. 34.

In FIG. 35, a fragmentary, cross-sectional view taken along line 35-35, FIG. 34 is shown. In FIG. 35, the cartridge 401 is depicted with extension 430 thereon, having a lateral ear or projection 430a positioned to engage forward cam or guide arrangement 420. The extension 430 is sized to allow the guide 420 to clear it, by passage above it, and to avoid the handle 440, when the tilt, tip or rock of the cartridge 401 into the seal position is conducted.

The forward cam arrangement 420, shown in the embodiments of FIGS. 28-35, is particularly useful when the housing 400, FIG. 33, is to be positioned, in use, with the outlet 408 tilted downwardly, as is shown in FIG. 33. Indeed in FIG. 33, the angle of tilt for the outlet 408 is greater than 5°, on the order of 15°. When the housing 402 is oriented in this manner, the forward cam or guide 440 can prevent the cartridge 401 from biasing against the seal surface at the outlet 408, before the cartridge 401 is in an appropriate position. The rear cam or guide 410, still operates to help direct cartridge 401 with the projection 415 appropriately positioned with respect to housing projection 414, as it does in the previous embodiment.

Figure 36:
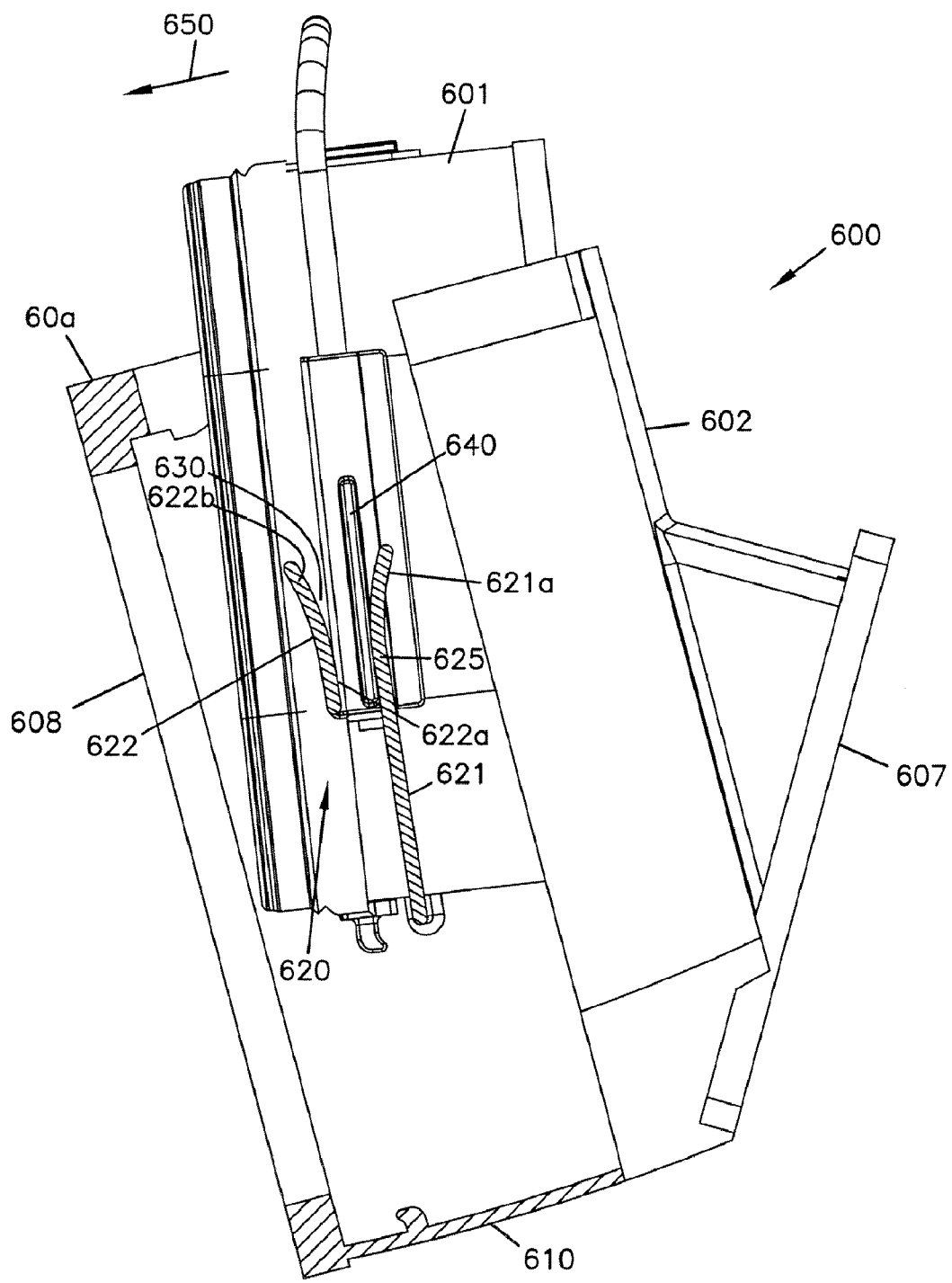
FIG. 36 is a view analogous to FIG. 30, of a alternate embodiment.

In FIG. 36 a further alternate embodiment 600 is shown comprising a filter cartridge 601 and a housing 602. The cartridge 601 may generally have features similar to those previously discussed. The housing 602 is similar including inlet 607, outlet 608, top 609 and bottom 610. The difference relates to biasing ramp or guide arrangement 620 comprising first ramp 621 and second ramp 622. The first ramp 621 generally operates analogously to ramp 411, FIG. 33. The second ramp 622 is different from arrangement 421, FIG. 33, however. First ramp 622 is positioned in a location vertically overlapped with an upper portion 621a of ramp 621. That is, ramp 622 is not positioned above ramp 621, but rather at a similar vertical height. Secondly, the shape of ramp 622 differs from cam or ramp 421, FIG. 33, in that ramp 622 includes a lower section 622a generally parallel with an opposite portion 625 of ramp 621; and, an upper portion 622b, which generally arcs away from ramp 621, is a somewhat mirror image of upper portion 621a. (In a typical arrangement there would be a set of ramps 621, 622 on opposite sides of the housing 602.)

As a result of the configuration shown, ramp or guide arrangement 620 provides a central channel 630, to facilitate positioning member 640 on cartridge 601 therebetween, for installation. Lower portion 622a of forward ramp 622, is sufficiently short, i.e., terminates above 610 at a location sufficient so that after installation of cartridge 601, cartridge 601 can be tipped forward, i.e., in the direction of arrow 650, with member 640 passing underneath ramp 622, to allow the cartridge 601 to be sealed in position for use.

In other general features, the arrangements 600 is similar to those previously described.

What is claimed is:

1. A filter cartridge comprising:
    (a) a filter media pack arrangement having inlet and outlet ends and including filter media comprising corrugated media secured to facing media and defining a plurality of inlet flutes and outlet flutes;
        (i) the filter media pack arrangement defining an inlet flow face and an opposite outlet flow face;
    (b) a housing seal support;
    (c) a pivot projection arrangement positioned to extend away from the media pack arrangement; and,
    (d) a housing seal member mounted on the housing seal support.

2. A filter cartridge according to claim 1 including:
    (a) a handle arrangement.

3. A filter cartridge according to claim 2 wherein:
    (a) the handle is slidably mounted on the filter cartridge to be slideable between an extended position and a retracted position.

4. A filter cartridge according to claim 1 wherein:
(a) the pivot projection arrangement includes an axial projection arrangement thereon directed toward one of the inlet and outlet ends of the filter media pack.
5. A filter cartridge according to claim 1 wherein:
(a) the pivot projection arrangement has a hook shape.
6. A filter cartridge according to claim 1 wherein:
(a) the framework includes a perimeter rim extending around the media pack arrangement adjacent the outlet flow face.
7. A filter cartridge according to claim 6 wherein:
(a) the framework includes a grid arrangement extending across the outlet flow face; and,
(b) the housing seal member is a radially directed seal member.
8. A filter cartridge according to claim 7 including:
(a) a perimeter rim secured to, and extending around, the media pack arrangement adjacent the inlet end.
9. A filter cartridge according to claim 8 wherein:
(a) the media pack arrangement comprises a coiled strip of media.
10. A filter cartridge comprising:
(a) a filter media pack arrangement having inlet and outlet ends and including filter media comprising corrugated media secured to facing media and defining a plurality of inlet flutes and outlet flutes;
    (i) the filter media pack arrangement having first and second opposite sides and defining an inlet flow face and an opposite outlet flow face;
(b) framework secured to the filter media pack arrangement including: a housing seal support; and, an axial pivot projection arrangement;
    (i) the axial pivot projection arrangement being positioned to extend from the second side of the media pack arrangement in a direction away from the first side of the media pack; and,
(c) a housing seal member mounted on the housing seal support;
(d) the filter cartridge being axially rockable with the axial pivot projection operating as a pivot, when installed in an air cleaner housing base, by a user rocking the media pack arrangement into and out of sealing engagement with the housing, without rotation of the housing seal member around a central axis.
11. A filter cartridge according to claim 1 wherein:
(a) the housing seal support comprises a support positioned adjacent the outlet flow face;
(b) the housing seal member is configured to form a radially directed seal with a housing when the filter cartridge is installed in a housing for use;
(c) a handle arrangement is positioned spaced from the housing seal support and the outlet flow face in a direction toward the inlet flow face; and,
(d) the pivot projection arrangement is positioned at an opposite side of the media pack from the handle arrangement.
12. A filter cartridge according to claim 11 wherein:
(a) the filter media pack comprises a non-circular coil of corrugated media secured to facing media.
13. A filter cartridge according to claim 12 wherein:
(a) the housing seal member is configured to form a radially outwardly directed housing seal.
14. A filter cartridge according to claim 13 wherein:
(a) the housing seal member is configured to form a radially outwardly directed seal at a location not surrounding the media pack.
15. A filter cartridge according to claim 14 wherein:
(a) the handle arrangement is configured so that a portion of a person's fingers can fit between a portion of the handle arrangement and a portion of the media pack.
16. An air cleaner assembly comprising:
(a) a housing defining a housing interior; the housing having a seal surface thereon; and,
(b) a removable and replaceable filter cartridge positioned in the housing interior; the filter cartridge comprising:
    (i) a filter media pack arrangement having inlet and outlet ends and including filter media comprising corrugated media secured to facing media and defining a plurality of inlet flutes and outlet flutes;
        (A) the filter media pack arrangement defining an inlet flow face and an opposite outlet flow face;
    (ii) a housing seal support;
    (iii) a pivot projection arrangement positioned to extend away from the media pack arrangement; and,
        (A) a housing seal member mounted on the housing seal support; the housing seal member being sealed against the seal surface of the housing;
    (iv) the axial pivot projection engaging the housing in a manner allowing the cartridge to rock into and out of sealing engagement with the housing.
17. A filter cartridge comprising:
(a) a filter media pack arrangement having inlet and outlet ends and including filter media comprising corrugated media secured to facing media and defining a plurality of inlet flutes and outlet flutes;
    (i) the filter media pack arrangement defining an inlet flow face and an opposite outlet flow face;
    (ii) the inlet flutes and outlet flutes extending between the inlet flow face and the outlet flow face;
(b) a housing seal arrangement including: a seal support positioned adjacent the outlet flow face; and, a housing seal member mounted on the housing seal support and configured to form a radially directed seal with a housing when the filter cartridge is installed in an air cleaner housing for use;
(c) a handle arrangement positioned spaced from the housing seal support and the outlet flow face in a direction toward the inlet flow face; and,
(d) a pivot projection arrangement positioned in extension away from the media pack in a direction opposite the handle arrangement;
    (i) the pivot projection arrangement being positioned at an opposite side of the media pack from the handle arrangement.
18. A filter cartridge according to claim 17 wherein:
(a) the filter media pack comprises a non-circular coil of corrugated media secured to facing media.
19. A filter cartridge according to claim 18 wherein:
(a) the housing seal member is configured to form a radially outwardly directed housing seal.

* * * * *